(12) United States Patent
Pulido

(10) Patent No.: US 12,248,512 B2
(45) Date of Patent: *Mar. 11, 2025

(54) SYSTEMS AND METHODS FOR DETERMINING WHETHER TO MODIFY CONTENT

(71) Applicant: Adeia Guides Inc., San Jose, CA (US)

(72) Inventor: Alejandro Sanchez Pulido, Chatsworth, CA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/406,496

(22) Filed: Jan. 8, 2024

(65) Prior Publication Data

US 2024/0143654 A1 May 2, 2024

Related U.S. Application Data

(63) Continuation of application No. 17/668,890, filed on Feb. 10, 2022, now Pat. No. 11,899,719, which is a continuation of application No. 16/404,531, filed on May 6, 2019, now Pat. No. 11,281,929.

(51) Int. Cl.
| | |
|---|---|
| *G06F 16/901* | (2019.01) |
| *G06F 16/58* | (2019.01) |
| *G06F 16/583* | (2019.01) |
| *G06F 16/587* | (2019.01) |
| *G06F 21/10* | (2013.01) |

(52) U.S. Cl.
CPC ........ *G06F 16/901* (2019.01); *G06F 16/5854* (2019.01); *G06F 16/5866* (2019.01); *G06F 16/587* (2019.01); *G06F 21/10* (2013.01)

(58) Field of Classification Search
CPC . G06K 9/4604; G06F 16/5854; G06F 16/587; G06F 16/5866; G06F 21/10; G06F 16/901; G06F 21/6245
USPC ........................................................ 382/190
See application file for complete search history.

(56) References Cited

U.S. PATENT DOCUMENTS

| | | | |
|---|---|---|---|
| 9,396,354 | B1 | 7/2016 | Murphy et al. |
| 11,281,929 | B2 | 3/2022 | Pulido |
| 2006/0143685 | A1 | 6/2006 | Vasishth et al. |
| 2007/0127771 | A1 | 6/2007 | Kaneda et al. |

(Continued)

*Primary Examiner* — Stephen P Coleman
(74) *Attorney, Agent, or Firm* — Haley Guiliano LLP

(57) ABSTRACT

The system determines whether content such as an image is suitable for content modification based on one or more criteria. The system includes decision engines or modules configured to evaluate one or more suitability metrics based on corresponding criteria such as publication status, restriction status, context, compatibility, and classification. If content is unsuitable for content modification because of entities or context depicted therein, privacy status, incompatibility with content modification, properties of the content file itself, or other aspects, the system generates a tag indicating the content is unsuitable for content modification. If content is suitable for content modification because of entities or context depicted therein, publication status, compatibility with content modification, properties of the content file itself, or other aspects, the system generates a content modification tag indicating the content is suitable for content modification. Metadata associated with the content is updated based on the flag.

20 Claims, 10 Drawing Sheets

(56) References Cited

U.S. PATENT DOCUMENTS

| | | |
|---|---|---|
| 2009/0304082 A1 | 12/2009 | Radhakrishnan et al. |
| 2011/0320365 A1 | 12/2011 | Gopalakrishnan |
| 2012/0072729 A1 | 3/2012 | Winograd et al. |
| 2016/0042225 A1 | 2/2016 | Barak |
| 2018/0091515 A1 | 3/2018 | Oh et al. |
| 2019/0174099 A1 | 6/2019 | Hodge et al. |
| 2019/0394203 A1* | 12/2019 | Estes .................. G06F 16/2379 |
| 2020/0356799 A1 | 11/2020 | Pulido |
| 2022/0343625 A1 | 10/2022 | Pulido |

* cited by examiner

SYSTEMS AND METHODS FOR DETERMINING WHETHER TO MODIFY CONTENT

CROSS-REFERENCE TO RELATED APPLICATIONS

This application is a continuation of U.S. patent application Ser. No. 17/668,890, filed Feb. 10, 2022, which is a continuation of U.S. patent application Ser. No. 16/404,531, filed May 6, 2019, now U.S. Pat. No. 11,281,929, the disclosures of which are hereby incorporated by reference herein in their entireties.

BACKGROUND

The present disclosure is directed to evaluating images, and, more particularly, to systems for evaluating context and publishing information of an image to determine whether it is a candidate for modification.

SUMMARY

Photo-editing and processing software use object recognition to identify people or objects within photos. For example, applications offer users the ability to automatically tag their photos by auto-identifying faces to identify who is in the photos. In a further example, some applications search for photos based on content based on a query or prompt (e.g., "Show me my images from Sicily"), with no need for tagging by the user. The ability to identify particular photo elements allows for their editing, adjustment, or even replacement. Should an application leverage such techniques for content modification, some problems may arise. For example, photos might be selected for modification in a way that violates the privacy of a user, is offensive to a user, is illegal, or is otherwise inappropriate. For example, a user may find editing of a private photo or a photo of a wedding to be inappropriate. Disclosed herein are systems and methods for screening photos or other content to determine whether content modification is permissioned. For example, systems and methods disclosed herein may avoid undesirable results by leveraging the fact users have already published a photo, and using further contextual analysis to identify sensitive or otherwise restricted photos.

Content is identified and analyzed to determine whether it is suitable for modification. The analysis includes, for example, a determination whether the content is published or otherwise public, a determination whether the content is restricted, a determination whether the content is compatible with modification, or a combination thereof. The analysis is based on processing of the content, metadata associated with the content, or both. The content is identified based on a request for modification, based on content-mining, or at the time of generation of the content, for example.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
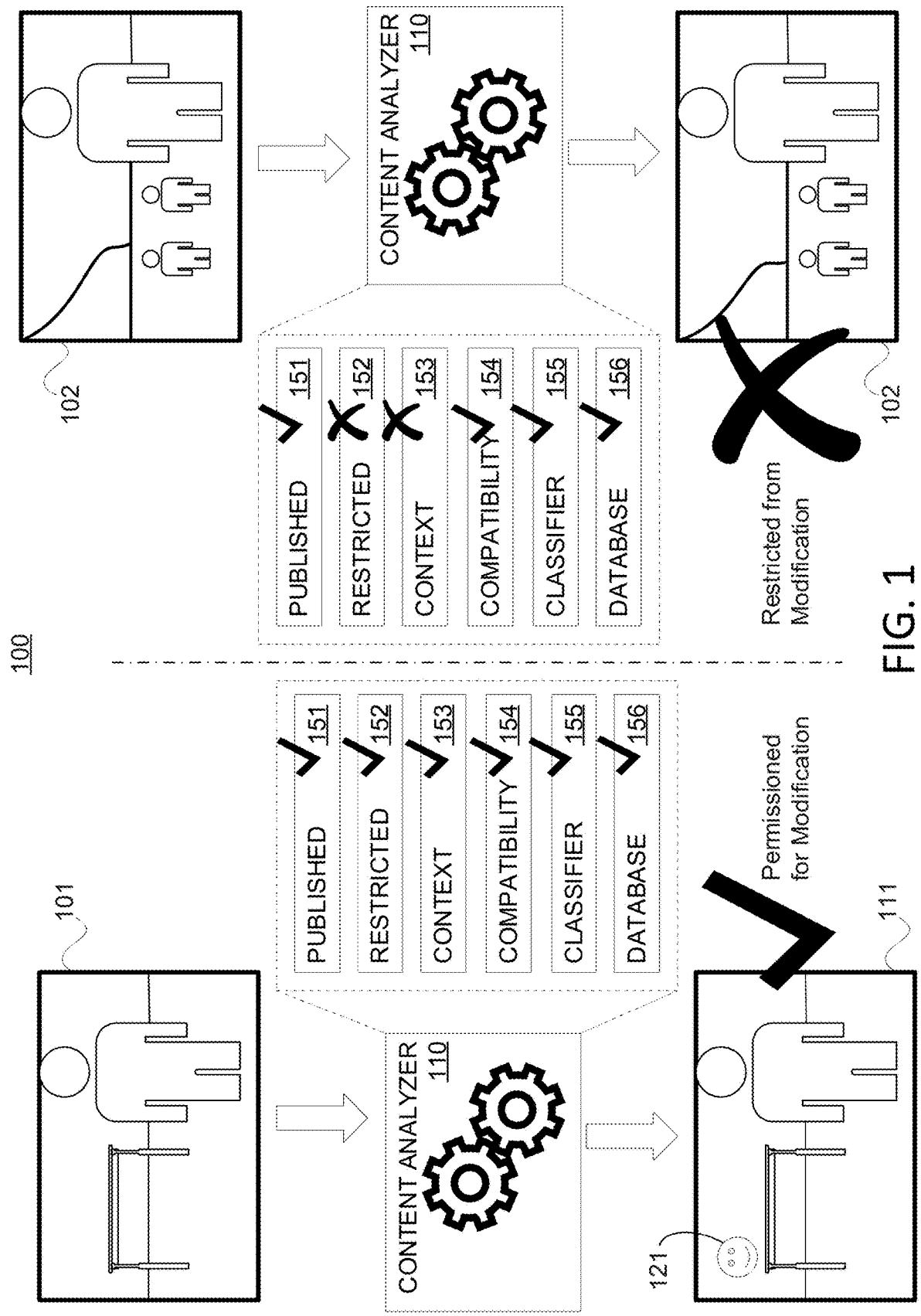
FIG. 1 is a block diagram of an illustrative content analyzer evaluating two images, in accordance with some embodiments of the present disclosure.

FIG. 1 is a block diagram of an illustrative content analyzer evaluating two images 101 and 102, in accordance with some embodiments of the present disclosure. Image 101, for example, includes an adult person with a table in the background. Image 102, for example, includes one adult person and two children. Content analyzer 110 screens each of images 101 and 102 to determine if they are suitable for modification (e.g., adding item 121). As illustrated, image analyzer 110 deems image 101 to be suitable for modification. As illustrated, content analyzer 110 deems image 102 to be unsuitable for modification, and accordingly image 102 is not modified. Content analyzer 110 may be implemented as any suitable combination of software and hardware, spanning one or more devices.

Content analyzer 110 determines whether an image is suitable for content modification based on one or more criteria. In some embodiments, content analyzer 110 includes one or more decision engines or modules configured to evaluate one or more suitability metrics based on corresponding criteria. For example, illustrative content analyzer 110 includes or relies on:

| | |
|---|---|
| Publication Engine 151 | Determines whether content is fully public, partially public, or private |
| Restriction Engine 152 | Determines whether content is restricted from modification |
| Context Engine 153 | Determines context information for the content |
| Compatibility Engine 154 | Determines compatibility of the content with modification |
| Classification Engine 155 | Determines a classification of the content |
| Reference Database 156 | Includes reference information for screening content |

In some embodiments, publication engine 151 determines whether content is suitable for publication or public consumption. An image or other content that is private or otherwise not public may be deemed unsuitable for content modification because the intended consumer audience is small or nonexistent. Further, private content may not be intended for public consumption, and may include images, video, or audio that is sensitive or private in nature. Publication engine 151 determines whether content is public or is a candidate for being made public based on available information (e.g., a metadata tag, a status identifier), determined information (e.g., identification of a public instance of the content), or both.

In some embodiments, restriction engine 152 determines whether content is restricted from modification. An image or other content that includes objects, entities, context, or a combination thereof that match restriction criteria may cause the content to be restricted from modification. For example, an image may include a child, a revered entity, a religious site (e.g., a shrine, temple, or other structure), an event (e.g., a wedding, a funeral, or other event generally considered off-limits to content modification), a questionable or sensitive object or act (e.g., a crime, a graphic image, or a controversial image), any other attributes that may trigger restriction, or any combination thereof. In a further example, content may be restricted from modification based on preference information (e.g., a user has tagged a photo as restricted to modification), a classification (e.g., as determined by classification engine 155), any other suitable information, or any combination thereof. Restriction engine 152 determines whether content is restricted from content modification based on available information (e.g., a metadata tag, a status identifier), determined information (e.g., identification of a public instance of the content), or both.

In some embodiments, context engine 153 determines context information for content. Context information includes information describing what is depicted or included in content such as a "who" (e.g., entities present in the content), a "what" (e.g., an event or description), a "where" (e.g., a location, a building, a structure), a "when" (e.g., a time of year, a date, a time of day), any other suitable information, or a combination thereof. For example, context information for image 102 may include a description such as:

| Who | child 1; child 2; Jane: mom |
| What | "family outdoors activity" |
| Where | "Concord, CA; ABC State Park" |
| When | "Mar. 1, 2019; 13:12:00" |

Context engine 153 determines context information of content based on available information (e.g., a metadata tag), determined information (e.g., identification and categorization of objects of the content), or both.

In some embodiments, compatibility engine 154 determines whether content is compatible with content modification, or for which types of modification the content is compatible with. For example, an image may include a plurality of advertisements (e.g., a photo taken in Times Square in New York City), and compatibility engine 154 may determine that the image is compatible with content modification. In a further example, an image may already include a plurality of advertisements (e.g., the photo taken in Times Square in New York), and compatibility engine 154 may determine that the image is compatible with certain products for content modification that do not conflict with the existing depictions. In a further example, compatibility engine 154 may determine that a quality, brightness, contrast, clarity, focus, arrangement, color palette, any other suitable visual aspect of an image, or any combination thereof is not compatible with content modification. Compatibility engine 154 determines compatibility information based on available information (e.g., a metadata tag), determined information (e.g., identification and categorization of objects of the content, evaluation of the content), or both.

In some embodiments, classification engine 155 determines a classification for the content based on a predetermined classification scheme. For example, classification engine 155 may include a plurality of classes of content, and may assign content to one or more classes. In some embodiments, for example, the other engines and databases of content analyzer 110 perform their respective processes based on a classification assigned by classification engine 155. In some embodiments, for example, classification engine 155 classifies the content based on determinations or information of the other engines and databases of content analyzer 110. Classification engine 155 classifies the content based on available information (e.g., a metadata tag), determined information (e.g., identification and categorization of objects of the content, evaluation of the content), or both.

In some embodiments, reference database 156 stores reference information that may be retrieved by the engines of content analyzer 110. Reference information includes, for example, reference classes or classifications, reference content, reference restriction categories, reference context categories, reference compatibility categories, reference content signatures, reference object signatures, any other suitable information, or any combination thereof.

In an illustrative example, content analyzer 110 identifies content such as image 101 or image 102. Content analyzer 110 then determines whether the content is suitable for content modification based on at least one of publication information (e.g., whether content is published and under what constraints), restriction information (e.g., whether content corresponds to a content modification blacklist), context information (e.g., whether the content's context is suitable for content modification), compatibility information (e.g., whether the content is compatible with content modification), classification (e.g., whether the context's classification is suitable for content modification), reference information (e.g., used to compare with the content for identification or other purposes), or any combination thereof. Considering image 101, content analyzer determines that image 101 is suitable for content modification. Considering image 102, content analyzer determines that image 102 is unsuitable for content modification. Content analyzer 110 need not modify an image deemed suitable for modification. For example, modification may be performed by a separate application, device, application instance, or processing engine.

Figure 2:
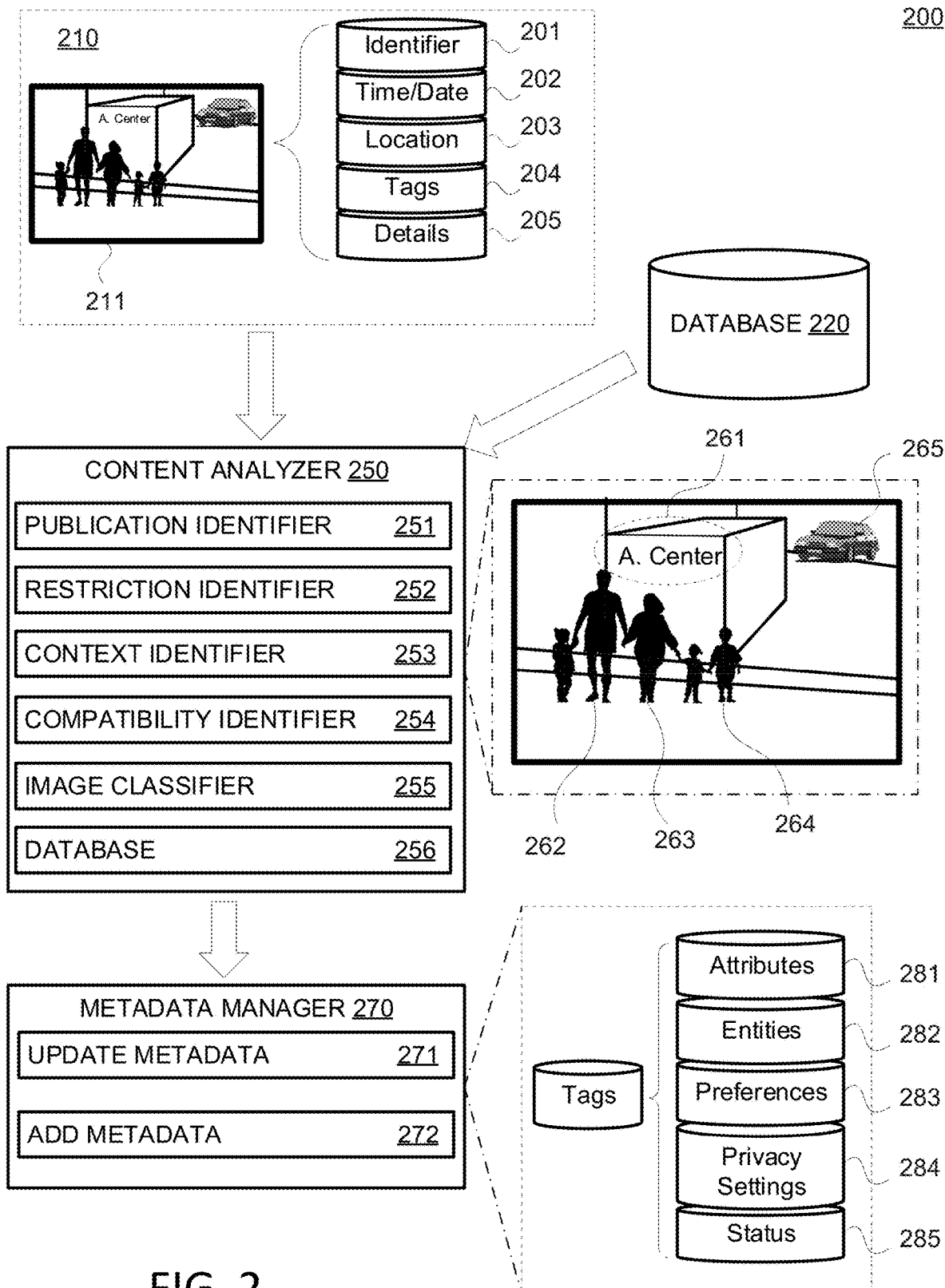
FIG. 2 is a block diagram of an illustrative system for screening an image, in accordance with some embodiments of the present disclosure.
Figure 3:
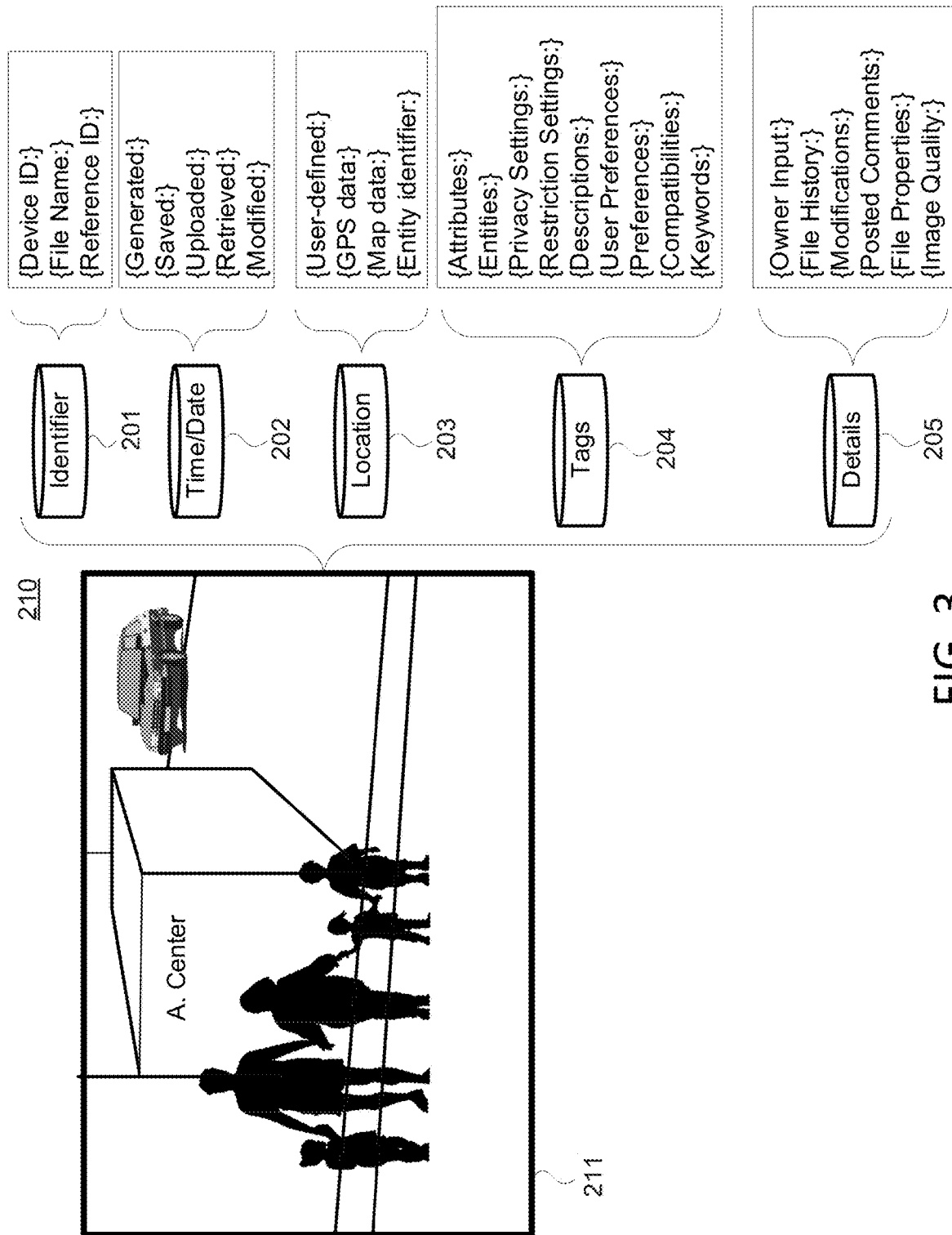
FIG. 3 is a block diagram of the illustrative image of FIG. 2 having corresponding metadata, in accordance with some embodiments of the present disclosure.

FIG. 2 is a block diagram of illustrative system 200 for screening an image, in accordance with some embodiments of the present disclosure. FIG. 3 is a block diagram of the illustrative image of FIG. 2 having corresponding metadata, in accordance with some embodiments of the present disclosure. Content analyzer 250 identifies information 210 associated with an image under consideration. Content analyzer 250 retrieves further information from database 220, in some circumstances, to aid in analyzing the image. Content analyzer 250 identifies attributes 261-265 of the image and based on these attributes, and other determinations, directs metadata manager 270 to update metadata associated with the image. In some embodiments, for example, content analyzer 250, or components thereof, are used to perform content modification analysis. In some embodiments, for example, content analyzer 250 and metadata manager 270, or components thereof, are used to perform content tagging (e.g., a tagging engine). In some embodiments, for example, content analyzer 250 and metadata manager 270, or components thereof, are used to identify and retrieve content (e.g., a photo selection engine).

Information 210 includes content data (e.g., the image itself) and metadata corresponding to the content. For example, as illustrated, the image depicts three people, a vehicle, and a building, and the metadata includes an image identifier (e.g., a file name), a time/date stamp indicating a time of creation for the image, a location tag indicating where the image was taken (e.g., generated when the content is created), metadata tags (e.g., keywords, scores, categorizations, and/or any other suitable information), and image details (e.g., quality, resolution, user-defined descriptions, and/or any other suitable information). The image may be stored in any suitable file format, as a raster image or a vector image. For example, the image may be stored as a JPEG, TIFF, GIF, BMP, PNG, SVG, or any other suitable file type. In a further example, the image may be stored using any suitable compression technique that may modify the file size of the image data. The metadata may be stored using any suitable file type, having any suitable data structure and organization. For example, the metadata may be stored as a collection of fields or elements each having one or more entries (e.g., string arrays, numbers, or other data objects). In a further example, the metadata may be stored in the same file as the content data, or may be stored in a separate file (e.g., with the content data file including a reference to the metadata file).

As illustrated in FIG. 3, information 210 includes image 211 and metadata 201-205 that correspond to image 211. Illustrative metadata 201-205 may be rearranged, added to, reduced, or otherwise modified, or otherwise assume any suitable format, in accordance with the present disclosure. The illustrative partitioning of metadata illustrated in FIG. 3 need not be followed. For example, the metadata may be organized as a single grouping of information with suitable organization and/or categorization.

Identifier 201, as illustrated, includes a device ID (e.g., identifying a device from which the content is generated or stored), a file name (e.g., of the content data, the metadata, or both), and a reference ID (e.g., used as an auxiliary identifier for the image, and may be user-defined). In some embodiments, identifier 201 includes a device hardware address, a device IP address, a device nickname (e.g., as defined by a DNS-type server), any other suitable identification information, or any combination thereof. In some embodiments, identifier 201 includes a file name, a file extension, a file type, a file size, directory information for where the file is stored in memory, any other suitable file-related information, or any combination thereof. In some embodiments, identifier 201 includes a file index, a file nickname (e.g., as specified by a web-based application), a file name of accompanying metadata, a file location of accompanying metadata, any other suitable reference information, or any combination thereof.

Time/date stamp 202, as illustrated, includes a time of generation (e.g., when the image was created), a time when content was saved (e.g., when the image was first or most recently saved), a time content was uploaded (e.g., when the image was uploaded to a web-based application), a time when content was retrieved (e.g., when the image was retrieved by content analyzer 250), and a time when content was modified (e.g., when the image was modified, if at all). In some embodiments, time/date stamp 202 includes a temporal history of transactions and events involving image 211. For example, a time of creation for each instance of image 211, as saved in memory of one or more devices, may be included in time/date stamp 202. In some embodiments, time/date stamp 202 may be application-specific. For example, a social media application may store an instance of information 210, with time/date stamp 202 including information relative to image 211 being stored and identified by the application (e.g., the creation date is the date the image is submitted to the application).

Location 203, as illustrated, includes, a user-defined location (e.g., as input by the user to a touchscreen), GPS data (e.g., coordinates or locations based on GPS data), map data, and an entity identifier (e.g., a site name such as "Citi Field"). In some embodiments, location 203 includes a keyword tag inputted by a user (e.g., "Phoenix," "Mexico," "Yosemite National Park"). In some embodiments, location 203 includes a GPS tag including raw data, from each of a plurality of satellites, such as a satellite clock value, ephemeris values, and almanac values. In some embodiments, location 203 includes a GPS tag including time, longitude, latitude, altitude, and number of satellites the data is based on. In some embodiments, location 203 includes a two-dimensional reference coordinate pair in the context of a digital map. For example, location 203 may include area designation A5 of an alphanumerically partitioned map region, with letters denoting one dimension and numbers denoting the orthogonal dimension. In some embodiments, location 203 includes a device-generated tag based on GPS data. For example, location 203 may include a street name, intersection identifier, neighborhood name, city name, state name, country name, park name, body of water name, geological feature name (e.g., Grand Canyon, Mojave Desert), geological feature description (e.g., mountain, forest, creekside), any other suitable tag corresponding to a location, or any combination thereof.

Tags 204, as illustrated, include attributes, entities, privacy settings, restriction settings, descriptions, user preferences, preferences, compatibilities, and keywords. Attributes may include, for example, people, places, events, items, arrangements thereof, any other suitable aspect depicted in content, or any combination thereof. For example, an attribute may include a particular person (e.g., Jon Doe), a person identifier (e.g., adult, woman, boy, baby), a binary indication of whether any person is depicted in the content, any other suitable person-related information, or any combination thereof. In a further example, attributes may include an event name (e.g., "Christmas," "Boston Marathon," "Trip to NYC"), an item identifier (e.g., a car, a boat, a building, a beverage, a computer, a user device, a television), an arrangement of items (e.g., a set dinner table, a group of people, a car race, a cityscape), any other suitable descriptors for aspects depicted in content, or any combination thereof.

Details 205, as illustrated, include owner input, file history, modifications, posted comments, file properties, and image quality. In some embodiments, details 205 include input from a user or content owner (e.g., descriptions, preferences, or status identifiers), a file transaction history (e.g., receiving, transmitting, storing, recalling, modifying), content modifications (e.g., a mapping of changed pixels in a rasterized image), a history of users' interaction with image 211 (e.g., comments, views, user tags such as "likes"), properties of the content data file or metadata file (e.g., file size, file location, file compression), a quality metric of image 211 (e.g., a resolution in units of pixels, a color scale such as color/grayscale/black-and-white, quality identifier such as good, bad, or blurry), any other suitable information, or any combination thereof.

Content analyzer 250, similar to content analyzer 150 of FIG. 1, includes publication identifier 251, restriction identifier 252, content identifier 253, compatibility identifier 254, image classifier 255, and database 256 (also each referred to as "application modules"). Content analyzer 250 may include any or all of the functionality of application modules 251-256, which are merely illustrative and need not be separate modules (e.g., a single module may include all of their functionality). In some embodiments, content analyzer 250 is capable of retrieving information from external database 220. By applying any or all of application modules 251-256, content analyzer 250 determines whether image 211 is suitable for content modification, what type of content modification is suitable or unsuitable, or a combination thereof. In some embodiments, the more particular determination and identification of objects depicted in content is desired for content modification purposes. For example, determination of advertisement audience and content modification appropriateness may aid in the results of content modification (e.g., recognition and reaction by consumers), and accordingly further detailed information of image 211 may be useful. As illustrated, content analyzer 250 has identified attributes including location 261 (e.g., "A. Center"), person 262 (e.g., adult 1), person 263 (e.g., adult 2), person 264 (e.g., child 1), and vehicle 265 (e.g., "2016 Fiat 500X"). Content analyzer 250 need not identify all attributes of a content item, and may identify any suitable number of attributes (e.g., five as illustrated in FIGS. 2-3). Context identifier 253 may be configured to identify objects of image 211 using any suitable technique such as pattern recognition techniques, artificial intelligence-based machine learning techniques, any other suitable techniques, or any combination thereof.

In some embodiments, publication identifier 251 determines whether image 211 is public, publicly available, private, shared, or undesignated. In some embodiments, publication identifier 251 accesses metadata (e.g., tags 204, details 205, or identifier 201) to determine whether image 211 has been previously tagged as public or private (e.g., by a user, an application, or a device). In some embodiments, publication identifier 251 determines whether image 211 is public based on whether image 211 is publicly available (e.g., displayed in a social media application feed, displayed on a webpage). For example, publication identifier 251 may generate one or more digital signatures corresponding to the image, describing features and aspects of the image. Publication identifier 251 may then compare the digital signatures against one or more reference signatures of publicly available content to identify the image as being publicly available. In some circumstances, publication identifier 251 may have insufficient information to make a determination of whether the content is public. In some such circumstances, publication identifier 251 may determine whether the content is suitable for publication. In some circumstances, publication identifier 251 may determine content is private and not suitable for content modification at all, or is suitable for limited content modification.

In some embodiments, restriction identifier 252 determines whether content is restricted from content modification, publication, or otherwise any modification. In some embodiments, restriction identifier 252 accesses metadata (e.g., tags 204, details 205, or identifier 201) to determine whether image 211 is restricted from modification. For example, the tags 204 may include a restriction status identifier such as "restricted' or "unrestricted." In a further example, restriction identifier 252 may access tags 204 to determine that image 211 includes a child (e.g., person 264), a spiritual place (e.g., location 261), or both, and in response, determines that image 211 is restricted from content modification.

In some embodiments, context identifier 253 generates digital signatures corresponding to the identified objects, describing features and aspects of the objects. In some such embodiments, context identifier 253 is configured to compare the digital signatures against one or more reference signatures to identify the objects based on known aspects of the reference signatures. For example, context identifier 253 may identify person 262 as a person depicted in image 211, and then may compare digital signatures of person 262 against known digital signatures for one or more identified users (e.g., Jon Doe) to identify person 262 as Jon Doe. Accordingly, context identifier 253 may identify attributes of image 211 generally (e.g., a person, a child) or more particularly (e.g., by the person's name, gender, age range, race, or other descriptor). In a further example, context identifier 253 may identify a group of people (e.g., including person 262, 263, and 264), and that one person of the group is a child (e.g., person 264). In a further example, context identifier 253 may identify vehicle 265 generally, and then compare one or more digital signatures for vehicle 265 against reference digital signatures of known vehicles to identify vehicle 265. In a further example, context identifier 253 may identify a location "A. Center" corresponding to a business or non-profit entity. In an illustrative example, "A. Center" may be a meditation center, and context identifier 253 may identify a context as spiritual or religious setting, which may impact whether content modification is appropriate. In a further illustrative example, "A. Center" may be a place of business such as a music store, and context identifier 253 may identify a context as commercial setting, which may impact whether content modification is appropriate. In some embodiments, context identifier 253 identifies text, numbers, words, or other symbols in image 211, and extracts keywords (e.g., to generate a search query) to further determine attributes depicted in image 211. For example, context identifier 253 may identify the text "A. Center" and along with a GPS tag, determine that the object is a commercial entity "A. Center, LLC" having an address, business type, open hours, social media application profile, and product type.

In some embodiments, compatibility identifier 254 determines whether image 211 is compatible with content modification or for what type of modification image 211 is suitable. For example, an image may include only natural scenes (e.g., a photo of a forest taken during hiking) with no suitable objects or areas that lend themselves to content modification. In some such circumstances, compatibility identifier 254 may determine that the image is not compatible with content modification. In some embodiments, compatibility identifier 254 determines whether content is compatible with content modification based on the metadata. For example, tags 204 may include tags indicating that image 211 depicts a private family outing, and compatibility identifier 254 may determine that image 211 is not compatible with content modification. In some embodiments, compatibility identifier 254 accesses metadata to determine what objects are depicted in the content.

In some embodiments, image classifier 255 classifies content based on any of the application modules of content analyzer 250, based on metadata, or both. In some embodiments, image classifier determines a category for an image based on which type of modification is suitable or not suitable for the image. For example, image classifier 255 may classify images depicting street scenes (e.g., having people, buildings, cars, and generally many logos) as suitable for any type of content modification. In a further example, for images depicting less objects, image classifier 255 may classify the image as being suitable for only certain types of products, if any.

In some embodiments, databases 220 and 256 store information and content that may be accessed by content analyzer 250. As illustrated, database 256 is local to content analyzer 250 (e.g., implemented on the same computing hardware or device). For example, database 256 may be stored in memory of a user device on which content analyzer 250 is executed. As illustrated, database 220 is external to content analyzer 250, and accordingly may be remote from content analyzer 250.

In some embodiments, the determination by content analyzer 250 regarding content modification need not be performed explicitly at the time of analysis. For example, content analyzer 250 may generate a content modification flag that is indicative of whether, and what type of, content modification is appropriate. The flag may be evaluated at a later time, for example, when a request to modify an image for content modification is received. Accordingly, content analyzer 250 may analyze content at any suitable point between, and including, content generation and reception of a request for content modification. For example, content analyzer 250 may analyze content as it is created or may analyze content at any suitable point in time after creation including in response to an explicit request. In an illustrative example, in the absence of a request for content modification, content analyzer 250 may mine one or more network entities or devices for stored content, analyze the content for content modification suitability, and generate a corresponding content modification flag for storage (e.g., for use when a request is received). In some embodiments, content analyzer 250 generates one or more tags that may be used to evaluate, for a given modification type, if an image is suitable.

Metadata manager 270, which may be, but need not be, included as part of content analyzer 250 (e.g., as illustrated, they are separate applications). Metadata manager 270 updates metadata of information 210, adds tags to metadata of information 210, generates metadata of information 210, or otherwise manages updating and storing of metadata corresponding to image 211. For example, in some embodiments, content analyzer 250 generates a products placement flag and transmits the flag to metadata manager 270, which updates the existing metadata of information 210 based on the flag. In some embodiments, metadata manager 270 reads and writes files to memory (e.g., local memory storage or remote storage via a communications network). For example, in some embodiments, metadata manager 270 opens a content data file and metadata and provides that information to content analyzer 250. In a further example, content analyzer 250 may generate tags or other changes to metadata, which may be provided to metadata manager 270, which in turn writes this information to an appropriate file and saves the files in suitable storage.

Figure 4:
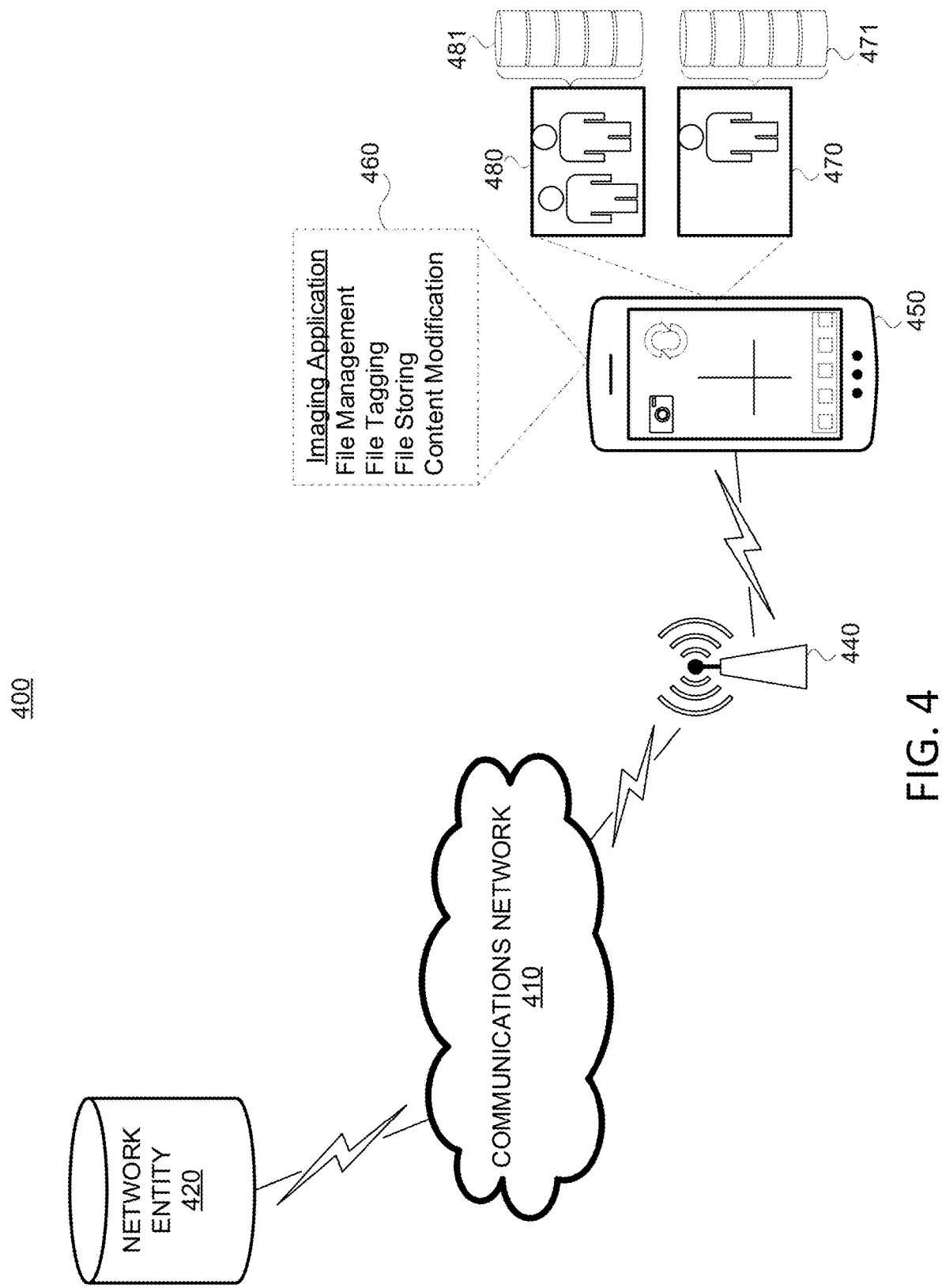
FIG. 4 is a block diagram of an illustrative system communicating over a network, in accordance with some embodiments of the present disclosure.
Figure 5:
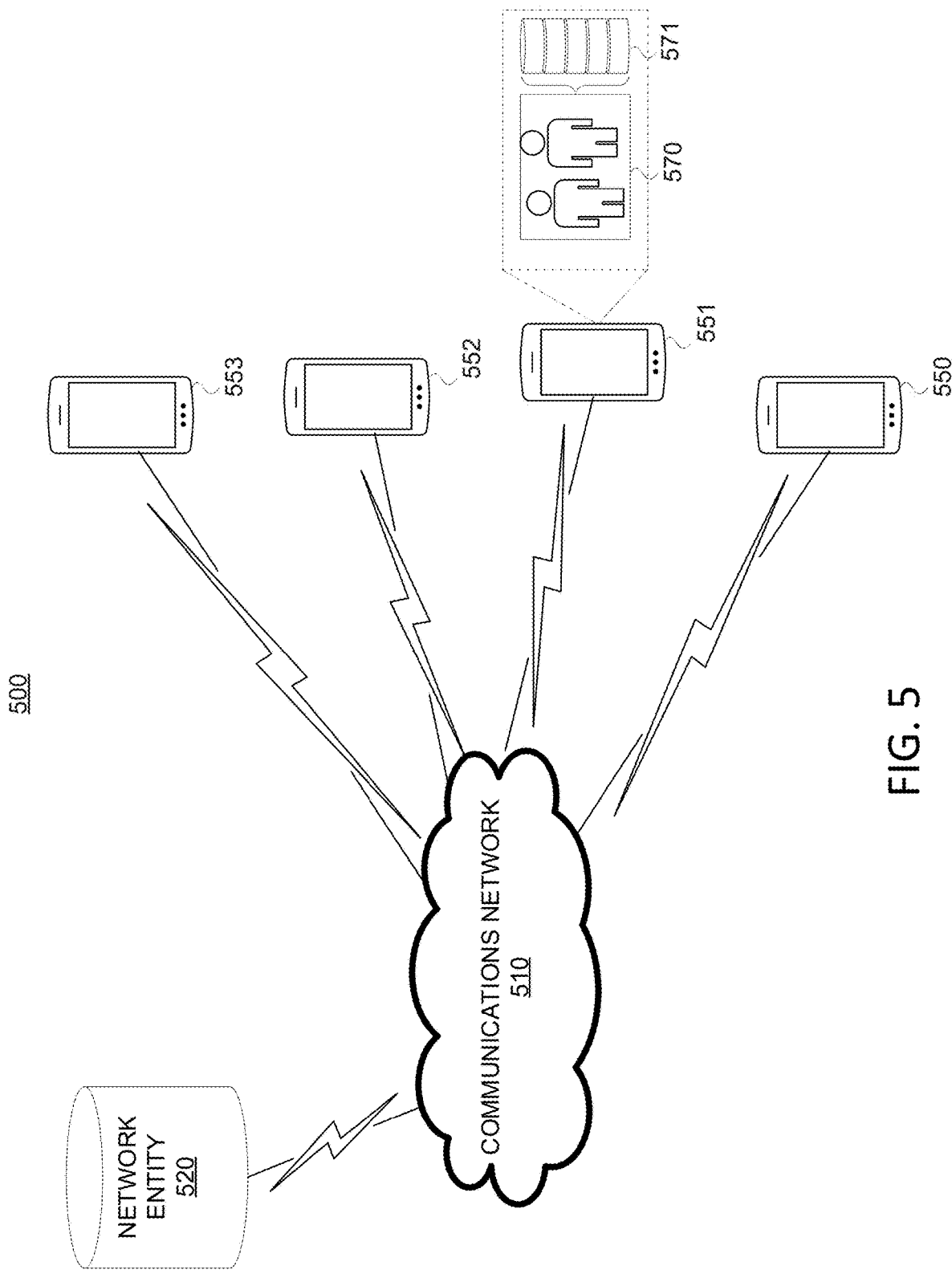
FIG. 5 is a block diagram of an illustrative system for locating and analyzing content at one or more user devices over a network, in accordance with some embodiments of the present disclosure.
Figure 6:
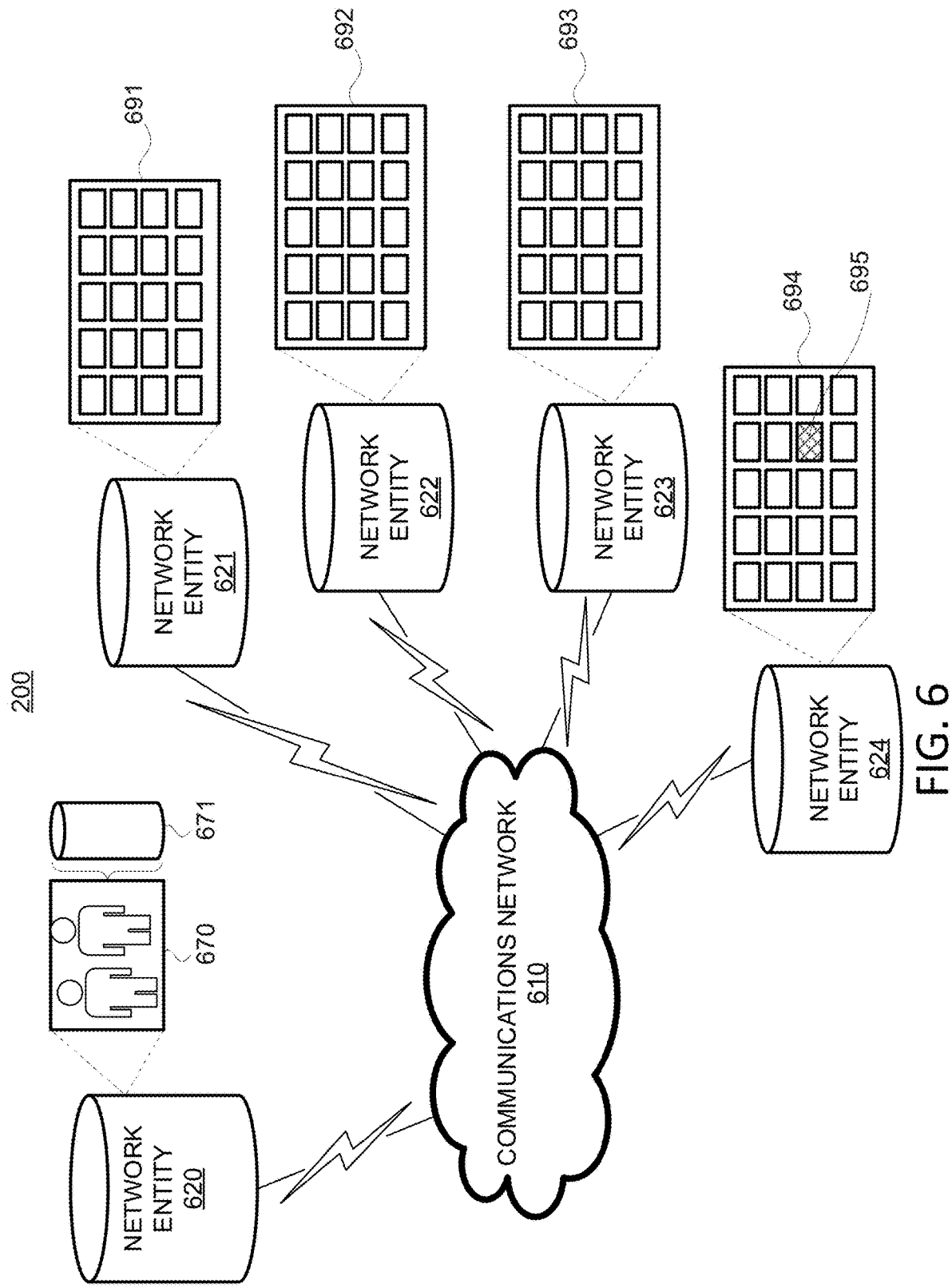
FIG. 6 is a block diagram of an illustrative system for locating and analyzing content over a network, in accordance with some embodiments of the present disclosure.

FIGS. 4-6 illustrate systems having network-based arrangements. For example, because content is typically generated and stored among user devices and network devices, and transmitted via communications networks, aspects of the present disclosure will be discussed in the context of the illustrative systems of FIGS. 4-6, although any suitable network-based arrangement may be used, in accordance with the present disclosure.

FIG. 4 is a block diagram of illustrative system 400 communicating over a network, in accordance with some embodiments of the present disclosure. Illustrative system 400 may be representative of circumstances in which a user creates content at user device 450, views content on a display of user device 450, downloads content from network entity 420 to user device 450, uploads content from user device 450 to network entity 420, or a combination thereof. In system 400, there may be more than one of each type of user device, but only one of each is shown in FIG. 4 to avoid overcomplicating the drawing. In addition, each user may utilize more than one type of user device and also more than one of each type of user device.

User device 450, illustrated as a wireless-enabled device, may be coupled to communications network 410 (e.g., connected to the Internet). For example, user device 450 is coupled to communications network 410 via a communications path to access point 440. In some embodiments, user device 450 may be a computing device coupled to communications network 410 via a wired connection. For example, user device 450 may also include wired connections to a LAN, or any other suitable communications link to network 410. Communications network 410 may be one or more networks including the Internet, a mobile phone network, mobile voice or data network (e.g., a 4G or LTE network), cable network, public switched telephone network, or other types of communications network or combinations of communications networks. Communications paths may include one or more communications paths, such as a satellite path, a fiber-optic path, a cable path, a path that supports Internet communications, free-space connections (e.g., for broadcast or other wireless signals), or any other suitable wired or wireless communications path or combination of such paths. Although communications paths are not drawn between user device 450 and network entity 420, these devices may communicate directly with each other via communications paths, such as those described above, as well as other short-range point-to-point communications paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. Devices may also communicate with each other directly through an indirect path via communications network 410.

System 400 includes network entity 420 (e.g., a server or other suitable computing device) coupled to communications network 410 via a suitable communications path. Communications between network entity 420 and user device 450 may be exchanged over one or more communications paths but are shown as a single path in FIG. 4 to avoid overcomplicating the drawing. Network entity 420 may include a database, one or more applications (e.g., as an application server, host server). A plurality of network entities may exist and be in communication with network 410, but only one is shown in FIG. 4 to avoid overcomplicating the drawing. In some embodiments, network entity 420 may include one source device. In some embodiments, network entity 420 implements an application that communicates with instances of applications at many user devices (e.g., user device 450). For example, an instance of a social media application may be implemented on user device 450, with application information being communication to and from network entity 420 which may store profile information for user (e.g., so that a current social media feed available on other devices than user device 450).

In some embodiments, network entity 420 includes one or more types of stored information, including, for example, publication information, restriction criteria, metadata, reference digital signatures, historical communications records, user preferences, user profile information, any other suitable information, or any combination thereof. Network entity 420 may include an applications-hosting database or server, plug-ins, a software developers kit (SDK), an applications programming interface (API), or other software tools configured to provide software (e.g., as download to a user device), run software remotely (e.g., hosting applications accessed by user devices), or otherwise provide applications support to applications of user device 450. In some embodiments, information from network entity 420, is provided to user device 450 using a client-server approach. For example, user device 450 may pull information from a server, or a server may push information to user device 450. In some embodiments, an application client residing on user device 450 may initiate sessions with network entity 420 to obtain information when needed (e.g., when data is out-of-date or when a user device receives a request from the user to receive data). In some embodiments, information may include user information (e.g., user profile information, user-created content). For example, the user information may include current and/or historical user activity information such as what content transactions the user engages in, whether the user interacts with a social network, at what times the user interacts with a social network to post content, what types of content the user typically uploads, stored contacts of the user, frequent contacts of the user, any other suitable information, or any combination thereof. In some embodiments, the user information may identify patterns of a given user for a period of time.

In some embodiments, an application may be implemented on user device 450, network entity 420, or both. For example, the application may be implemented as software or a set of executable instructions which may be stored in storage of the user device 450, network entity 420, or both, and executed by control circuitry of the respective devices. In some embodiments, an application may include an imaging application, a photo management application, a content modification application, or a combination thereof, that is implemented as a client-server-based application where only a client application resides on user device 450, and a server application resides on a remote server (e.g., network entity 420). For example, an application may be implemented partially as a client application on user device 450 (e.g., by control circuitry of user device 450) and partially on a remote server as a server application running on control circuitry of the remote server (e.g., control circuitry of network entity 420). When executed by control circuitry of the remote server, the application may instruct the control circuitry to generate a display and transmit the generated display to user device 450. The server application may instruct the control circuitry of the remote device to transmit data for storage on user device 450. The client application may instruct control circuitry of the receiving user device to generate the application displays.

In some embodiments, the arrangement of system 400 is a cloud-based arrangement. The cloud provides access to services, such as information storage, messaging, or social networking services, among other examples, as well as access to any content described above, for user devices. Services can be provided in the cloud through cloud computing service providers, or through other providers of online services. For example, the cloud-based services can include a storage service, a sharing site, a social networking site, or other services via which user-sourced content is distributed for viewing by others on connected devices. These cloud-based services may allow a user device to store information to the cloud and to receive information from the cloud rather than storing information locally and accessing locally stored information. Cloud resources may be accessed by a user device using, for example, a web browser, a messaging application, a social media application, a desktop application, a mobile application, and/or any combination of access applications of the same. User device 450 may be a cloud client that relies on cloud computing for application delivery, or user device 450 may have some functionality without access to cloud resources. For example, some applications running on user device 450 may be cloud applications (e.g., applications delivered as a service over the Internet), while other applications may be stored and run on user device 450. In some embodiments, user device 450 may receive information from multiple cloud resources simultaneously.

In an illustrative example, a user may create images 480 and 470 using a camera integrated into user device 450. In some embodiments, the user may use imaging application 460 to create images 470 and 480. Imaging application 460 may capable of file management, file tagging, file storing, content modification, any other suitable functionality, or any combination thereof. Imaging application 460 may be implemented as a software application on user device 450, or may be included as an application operating within a host program running on user device 450. In some embodiments, imaging application 460, or other suitable application, generates metadata 471 and 481 for respective images 470 and 480 at the time of creation. For example, when a photo is taken, the application may query the user for information such as filename, file type, tags, description, public/private status, any other suitable information, or any combination thereof. In some embodiments, imaging application 460 manages formatting and storing images 470 and 480, while management of metadata and tagging is performed by a separate application (e.g., at a later time than image creation). In some embodiments, images 470 and 480, among a plurality of images, are stored in memory of user device 450.

In an illustrative example, a user may download images from network entity 420 via communications network 410 for viewing and storage in memory of user device 450. For example, the user may download images from a social networking feed, a website, a file site, another device (e.g., via a USB connection), any other suitable repository, or any combination thereof. Downloaded content may include metadata as part of the content file(s), separate metadata files, or both. In some embodiments, imaging application 460 generates metadata for downloaded images.

In an illustrative example, a user may upload images to network entity 420 via communications network 410 for storage in memory of network entity 420. For example, the user may upload images to a social networking feed, a website, a file site, another device (e.g., via a USB connection), any other suitable repository, or any combination thereof. Uploaded content may include metadata as part of the content file(s), separate metadata files, or both. In some embodiments, imaging application 460 generates metadata for uploaded images prior to uploading.

In an illustrative example, network entity 420 may search for content among devices coupled to communications network 410. For example, network entity 420 may communicate with user device 450 to discover new images that may be stored on network entity 420. Further description of some such embodiments is provided in the context of FIG. 5, for example.

In an illustrative example, a photo selection engine may operate on control circuitry of network entity 420, user device 450, or both, identifying and retrieving content from one or more devices (e.g., user device 450). User device 450, network entity 420, or both, may host a tagging engine, which generates tags as content is created (e.g., by updating metadata 481 and 471).

FIG. 5 is a block diagram of illustrative system 500 for locating and analyzing content at one or more user devices 550-553 over network 510, in accordance with some embodiments of the present disclosure. Illustrative system 500 may be representative of circumstances in which multiple users create content at user devices 550, 551, 552, and 553 and view content on respective displays of user devices 550-553, download content from network entity 520 to user devices 550-553, upload content from user devices 550-553 to network entity 520, or a combination thereof. Each user may utilize more than one type of user device and also more than one of each type of user device. Any of user devices 550-553 may be the same as, or similar to, user device 450 of FIG. 4.

User devices 550-553 are coupled to communications network 510, which may be the same as, or different from, network 410 *o* FIG. 4. In some embodiments, each of user devices 550-553 may be a computing device coupled to communications network 510 via a wired connection, a wireless connection, any other suitable communications link to network 510, or any combination thereof. Communications network 510 may be one or more networks including the Internet, a mobile phone network, mobile voice or data network, cable network, public switched telephone network, or other types of communications network or combinations of communications networks. Communications paths may include one or more communications paths, such as a satellite path, a fiber-optic path, a cable path, a path that supports Internet communications, free-space connections (e.g., for broadcast or other wireless signals), or any other suitable wired or wireless communications path or combination of such paths. Although direct communications paths are not drawn between user devices 550-553 and network entity 520, these devices may communicate directly with each other via communications paths, such as those described above, as well as other short-range point-to-point communications paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. Devices may also communicate with each other directly through an indirect path via communications network 510.

System 500 includes network entity 520 (e.g., a server or other suitable computing device) coupled to communications network 510 via a suitable communications path. Communications between network entity 520 and user devices 550-553 may be exchanged over one or more communications paths but are shown as a single path in FIG. 5 to avoid overcomplicating the drawing. Network entity 520 may include a database, one or more applications (e.g., as an application server, host server), or both. A plurality of network entities may exist and be in communication with network 510, but only one is shown in FIG. 5 to avoid overcomplicating the drawing. In some embodiments, network entity 520 may include one source device. In some embodiments, network entity 520 implements an application that communicates with instances of applications at many user devices (e.g., user devices 550-553). For example, an instance of a social media application may be implemented on each of user devices 550-553, with application information being communication to and from network entity 520 which may store profile information for each user (e.g., so that a current social media feed available on other devices than user devices 550-553). In some embodiments, network entity 520 includes one or more types of stored information, including, for example, publication information, restriction criteria, metadata, reference digital signatures, historical communications records, user preferences, user profile information, any other suitable information, or any combination thereof. Network entity 520 may include an applications-hosting database or server, plug-ins, a software developers kit (SDK), an applications programming interface (API), or other software tools configured to provide software (e.g., as download to a user device), run software remotely (e.g., hosting applications accessed by user devices), or otherwise provide applications support to applications of user devices 550-553. In some embodiments, information from network entity 520, is provided to user devices 550-553 using a client-server approach. For example, user devices 550-553 may each pull information from a server, or a server may push information to each of user devices 550-553. In some embodiments, an application client residing on any of user devices 550-553 may initiate sessions with network entity 520 to obtain information when needed (e.g., when data is out-of-date or when a user device receives a request from the user to receive data). In some embodiments, information may include user information (e.g., user profile information, user-created content). For example, the user information may include current and/or historical user activity information such as what content transactions the user engages in, whether the user interacts with a social network, at what times the user interacts with a social network to post content, what types of content the user typically uploads, stored contacts of the user, frequent contacts of the user, any other suitable information, or any combination thereof. In some embodiments, the user information may identify patterns of a given user for a period of time.

In some embodiments, an application may be implemented on user devices 550-553, network entity 520, or a combination thereof. For example, the application may be implemented as software or a set of executable instructions which may be stored in storage of each of user devices 550-553, network entity 520, or a combination thereof, and executed by control circuitry of the respective devices. In some embodiments, an application may include an imaging application, a photo management application, a content modification application, or a combination thereof, that is implemented as a client-server-based application where only a client application resides on user devices 550-553, and a server application resides on a remote server (e.g., network entity 520). For example, an application may be implemented partially as a client application on user devices 550-553 (e.g., by control circuitry of respective user devices 550-553) and partially on a remote server as a server application running on control circuitry of the remote server (e.g., control circuitry of network entity 520). When executed by control circuitry of the remote server, the application may instruct the control circuitry to generate respective displays and transmit the generated displays to user devices 550-553. The server application may instruct the control circuitry of the remote device to transmit data for storage on any or all of user devices 550-553. The client application may instruct control circuitry of the receiving user device to generate the application displays.

In some embodiments, the arrangement of system 500 is a cloud-based arrangement. The cloud provides access to services, such as information storage, messaging, or social networking services, among other examples, as well as access to any content described above, for user devices. Services can be provided in the cloud through cloud computing service providers, or through other providers of online services. For example, the cloud-based services can include a storage service, a sharing site, a social networking site, or other services via which user-sourced content is distributed for viewing by others on connected devices. These cloud-based services may allow a user device to store information to the cloud and to receive information from the cloud rather than storing information locally and accessing locally stored information. Cloud resources may be accessed by a user device using, for example, a web browser, a messaging application, a social media application, a desktop application, a mobile application, and/or any combination of access applications of the same. User devices 550-553 may be cloud clients that rely on cloud computing for application delivery, or user devices 550-553 may have some functionality without access to cloud resources. For example, some applications running on user devices 550-553 may be cloud applications (e.g., applications delivered as a service over the Internet), while other applications may be stored and run on user devices 550-553. In some embodiments, user devices 550-553 may receive information from multiple cloud resources simultaneously.

In an illustrative example, a user may create image 570 using a camera integrated into user device 551. In some embodiments, the user may use an application to create, edit, format, and store image 570. The application may be implemented as a software application on user device 551, or may be included as an application operating within a host program running on user device 551. In some embodiments, the application generates metadata 571 for image 570 at the time of creation. For example, when a photo is taken, the application may query the user for information such as filename, file type, tags, description, public/private status, any other suitable information, or any combination thereof. Images 570, among a plurality of images, is stored in memory of user device 551.

In an illustrative example, the user associated with user device 551 may upload, or otherwise share image 570 with other users by making image 570 publicly available. An application on user device 551 may manage uploading image 570 and metadata 571 to network entity 520, which may in turn update one or more instances of the application on user devices 550, 552, and 553 to reflect the publication of image 570. In some embodiments, the application may update metadata 571 to reflect the publication of image 570.

In an illustrative example, network entity 520 searches among devices coupled to network 510 for content that may be considered for content modification. In some embodiments, network entity 520 may host an application to user devices 550-553. The application may determine what content is stored in each of user devices 550-553, and for any content not already considered for content modification, the application may determine whether the content is suitable for content modification (e.g., as described in the context of FIGS. 1-3). In some embodiments, network entity 520 generates metadata, updates existing metadata, or both in response to analyzing content for suitability for content modification. For example, network entity 520 may identify one or more products for placement, and then search among content stored on, or associated with users of (e.g., and stored on network entity 520), user devices 550-553.

In an illustrative example, applications operating on user devices 550-553 may communicate with one another (e.g., via a WiFi, or data network such as 4G). In some embodiments, a user may create and store image 570 locally. If the user does not upload (e.g., to a cloud-based storage device), post (e.g., on a social media feed), share (e.g., via a messaging application), or otherwise make image 570 public, other user devices (e.g., user devices 550, 552, and 553) and network entities (e.g., network entity 520) may have limited access to image 570. Further, even with access to unpublished image 570, an application searching for content for which content modification is suitable may recognize that image 570 is not published and determine that it is not suitable for content modification. The application may determine that image 570 is not published based on metadata 571, lack of uploading, posting, or sharing of image 570, or both. If the user does upload, post, share, or otherwise make image 570 public, then an application operating on user devices 550, 552, and 553, and network entity 520 may determine image 570 is published, and therefore suitable to be considered for content modification (e.g., subject to analysis based on other criteria as illustrated in FIGS. 1-3).

In an illustrative example, a photo selection engine may operate on control circuitry of any or all of network entity 520 and user devices 550-553, identifying and retrieving content from one or more devices (e.g., user devices 550-553). User devices 550-553, network entity 520, or a combination thereof, may host a tagging engine, which generates tags as content is created (e.g., by updating metadata 571). A content modification engine may operate on control circuitry of network entity 520, user devices 550-553, or a combination thereof, analyzing content for content modification suitability.

FIG. 6 is a block diagram of illustrative system 600 for locating and analyzing content over network 610, in accordance with some embodiments of the present disclosure. Illustrative system 600 may be representative of circumstances in which multiple network entities (e.g., network entities 620, 21, 622, 623, and 624) communicate with each other over network 610. Network entities 620-624 may include user devices, servers, application servers, cloud-based databases, computers (e.g., personal computers, laptops, tablets), any other suitable computing equipment, or any combination thereof.

Network entities 620-624 are coupled to communications network 610, which may be the same as, or different from, network 410 *o* FIG. 4 or network 510 of FIG. 5. In some embodiments, network entities 620-624 may be computing devices coupled to communications network 610 via a wired connection, a wireless connection, any other suitable communications link to network 610, or any combination thereof. Communications network 610 may be one or more networks including the Internet, a mobile phone network, mobile voice or data network, cable network, public switched telephone network, or other types of communications network or combinations of communications networks. Communications paths may include one or more communications paths, such as a satellite path, a fiber-optic path, a cable path, a path that supports Internet communications, free-space connections (e.g., for broadcast or other wireless signals), or any other suitable wired or wireless communications path or combination of such paths. Although direct communications paths are not drawn between network entities 620-624, these devices may communicate directly with each other via communications paths, such as those described above, as well as other short-range point-to-point communications paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. Devices may also communicate with each other directly through an indirect path via communications network 610.

System 600 includes network entities 620-624 (e.g., each being a server or other suitable computing device) coupled to communications network 610 via a suitable communications path. Communications between network entities 620-624 may be exchanged over one or more communications paths but are shown as a single path in FIG. 6 to avoid overcomplicating the drawing. Network entities 620-624 may each include a database, an application server, a host server), or a combination thereof. In some embodiments, network entities 620-624 implement an application that communicates with instances of applications at other network entities. For example, an instance of an imaging application may be implemented on each of network entities 620-624, with application information being communication to and from the network entities, which may store profile information for a plurality of users. In some embodiments, network entities 620-624 each include one or more types of stored information, including, for example, publication information, restriction criteria, metadata, reference digital signatures, historical communications records, user preferences, user profile information, any other suitable information, or any combination thereof. Any or all of network entities 620-624 may include an applications-hosting database or server, plug-ins, a software developers kit (SDK), an applications programming interface (API), or other software tools configured to provide software (e.g., as download to a user device), run software remotely (e.g., hosting applications accessed by user devices), or otherwise provide applications support to applications of network entities 620-624. In some embodiments, information from any of network entities 620-624 is provided to other of network entities 620-624 using a client-server approach. For example, network entities 620-624 may each pull information from a server, o reach other, or a server may push information to any or all of network entities 620-624. In some embodiments, an application client residing on any of network entities 620-624 may initiate sessions with any other network entity to obtain information when needed (e.g., when data is out-of-date or when a user device receives a request from the user to receive data). In some embodiments, information may include content, metadata, user information, content modification criteria information, any other suitable information, or any combination thereof.

In some embodiments, an application may be implemented on network entities 620-624. For example, the application may be implemented as software or a set of executable instructions which may be stored in storage of each of network entities 620-624, and executed by control circuitry of the respective devices. In some embodiments, an application may include an imaging application (e.g., for creating, editing, and filing content in storage), a photo management application (e.g., for storing and/or modifying content), a content modification application (e.g., for analyzing content for suitability of content modification), a content identifying application (e.g., for identifying content among network devices), or a combination thereof, that is implemented as a client-server-based application where only a client application resides on some of network entities 620-624, and a server application resides on other of network entities 620-624. For example, an application may be implemented partially as a client application on network entities 620-624 (e.g., by control circuitry of respective network entities 620-624) and partially on a remote server as a server application running on control circuitry of the remote server.

In some embodiments, the arrangement of system 600 is a cloud-based arrangement. The cloud provides access to services, such as information storage, messaging, or social networking services, among other examples, as well as access to any content described above, for user devices. Services can be provided in the cloud through cloud computing service providers, or through other providers of online services. For example, the cloud-based services can include a storage service, a sharing site, a social networking site, or other services via which user-sourced content is distributed for viewing by others on connected devices. These cloud-based services may allow a network entity to store information to the cloud and to receive information from the cloud rather than storing information locally and accessing locally stored information. Cloud resources may be accessed by a network entity or user device using, for example, a web browser, a messaging application, a social media application, a desktop application, a mobile application, and/or any combination of access applications of the same. Network entities 620-624 may be cloud clients that rely on cloud computing for application delivery, or network entities 620-624 may have some functionality without access to cloud resources. For example, some applications running on network entities 620-624 may be cloud applications (e.g., applications delivered as a service over the Internet), while other applications may be stored and run on network entities 620-624. In some embodiments, network entities 620-624 may receive information from multiple cloud resources simultaneously.

In an illustrative example, network entity 620 may identify image 670 having associated metadata 671. Network entity 620 may analyze image 670 for suitability for content modification using any of the illustrative techniques described herein. In order to determine publication status, for example, network entity 620 may search among content catalogs 691, 692, 693, and 694 stored in memory of respective network entities 621, 622, 623, and 624. Network entity 620 may generate digital signatures of image 670, or objects depicted therein, for comparison with content stored in content catalogs 691, 692, 693, and 694. Network entities 621-624 may store respective content catalogs 691-694 (e.g., collections of content, or a gallery), associated metadata, along with reference signatures of images stored therein, reference signatures of objects depicted therein, or a combination thereof. Network entity 620 may compare digital signatures associated with image 570 with reference digital signatures of images of content catalogs 691-694. If a match is found, or otherwise network entity 620 determines that image 570 corresponds to an image of content catalogs 691-694, and the matching image is published, then network entity 620 may determine that image 670 is published. If a match is found, or otherwise network entity 620 determines that image 570 corresponds to an image of content catalogs 691-694, and the matching image is private, then network entity 620 may determine that image 670 is not published. If no match is found, or otherwise network entity 620 determines that image 570 does not correspond to any image of content catalogs 691-694 then network entity 620 may determine that image 670 is not published, publishable, not publishable, or determine another publication status based on predetermined criteria. To illustrate, network 620 may determine that image 695 of content catalog 694 of network entity 624 matches image 670, and accordingly may access metadata of image 695 to determine whether image 695 is public, or otherwise suitable for content modification.

In an illustrative example, network entity 620 may receive a request for content modification, a request for content suitable for content modification, one or more criteria for analyzing content, or a combination thereof. In response, network entity 620 may search for content stored in memory of network entity 620, among network entities 621-624, or a combination thereof. In some circumstances, network entity 620 may receive one or more digital signatures of an image, or attributes depicted therein, and compare the one or more digital signatures with reference digital signatures (e.g., stored in any of network entities 620-624). In some circumstances, network entity 620 may receive a request for content for which content modification is suitable. In response, network entity 620 may search among, and analyze, content of network entities 620-624). In some circumstances, network entity 620 may receive a request for content for which content modification of a particular type is suitable. In response, network entity 620 may search among, and analyze, content of network entities 620-624). In some circumstances, network entity 620 may receive one or more criteria for content modification suitability analysis. In response, network entity 620 may search among, and analyze, content of network entities 620-624), and analyze the content based on the one or more criteria (e.g., generating or updating metadata after analysis).

In an illustrative example, a photo selection engine may operate on control circuitry of network entity 620, identifying and retrieving content from one or more of network entities 621-624. Network entities 620-624, or a combination thereof, may host a tagging engine, which generates tags as content is created and uploaded (e.g., for content in any of content catalogs 691-694). A content modification engine may operate on control circuitry of any or all of network entities 620-624, analyzing content for content modification suitability.

Figure 7:
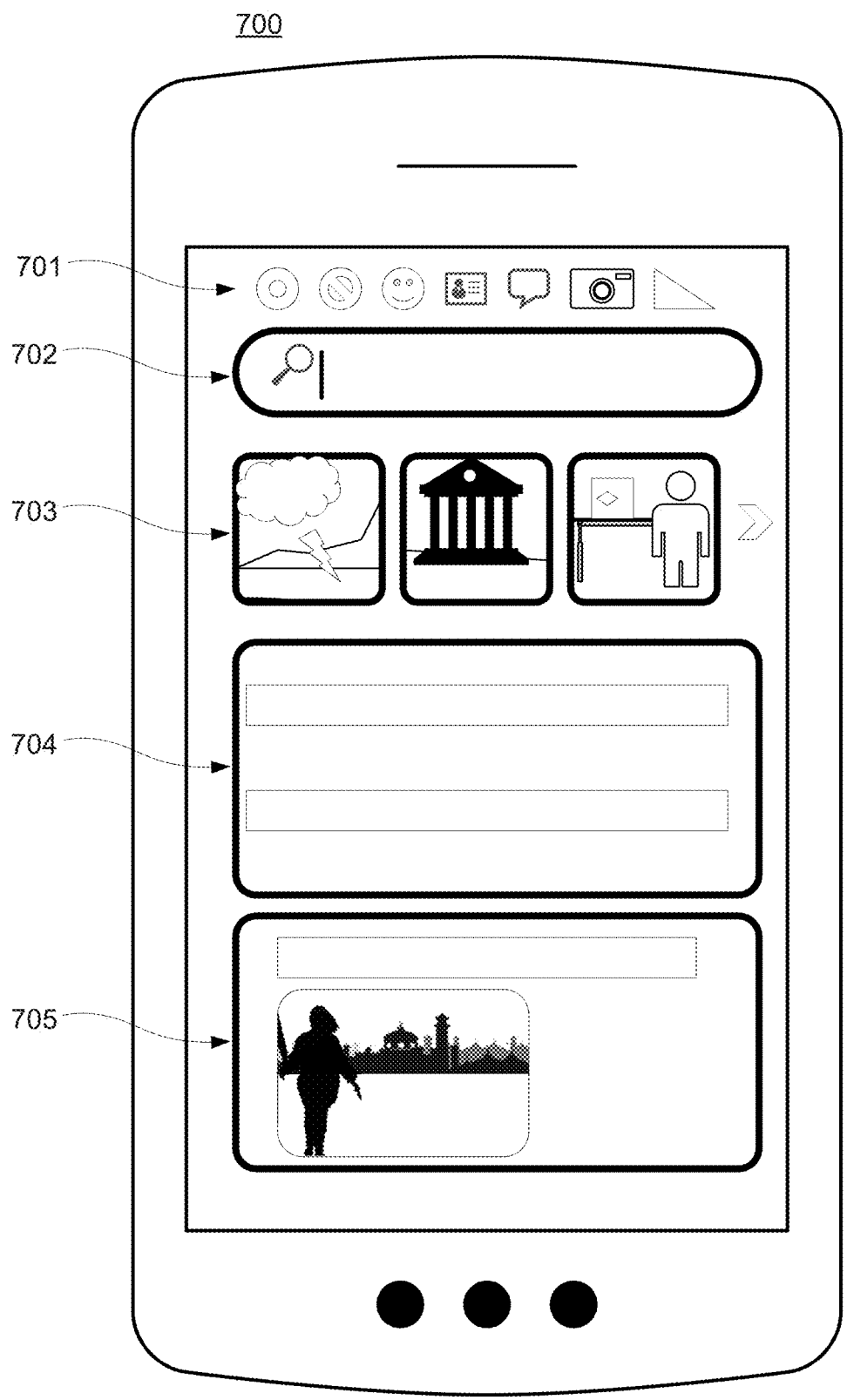
FIG. 7 shows an illustrative display of a user device with an application operating, in accordance with some embodiments of the present disclosure.

FIG. 7 shows an illustrative display of user device 700 with an application operating, in accordance with some embodiments of the present disclosure. User device may be the same as, similar to, or different than any of user device 450 of FIG. 4, user devices 550-553 of FIG. 5, for example. In some embodiments, user device 700 is a smartphone. The display of user device 700 shows an application, which, as illustrated, may include a social media feed or other platform for displaying and sharing content. The application includes toolbar 701, search field 702, image gallery 703, input region 704, and region 705. Although shown as separate regions, application includes toolbar 701, search field 702, image gallery 703, input region 704, and region 705 each may be omitted, combined with other regions, further partitioned, or otherwise modified from the illustration of FIG. 7, in accordance with some embodiments of the present disclosure.

Toolbar 701 includes soft buttons or selectable icons that provide indications or commands to the application from the user (e.g., via haptic interaction with a touchscreen or input to a displayed keyboard). In some embodiments, toolbar 701 provides options for the user to interact with the application. For example, toolbar 701 may be used for changing the display, launching add-ins or applications (e.g., camera applications, messaging applications), searching (e.g., among contacts, content, functions, memory storage), any other suitable function, or any combination thereof.

Search field 702 includes a region for text input by a user (e.g., using a displayed keyboard), which may be used to generate a search query. In some embodiments, the user may input text to search for content, contacts, or other information.

Image gallery 703 includes thumbnails or other representations of content stored in memory of user device 700, stored in memory of a network entity hosting the application, any other suitable content, or any combination thereof. As illustrated, for example, three image thumbnails are shown, and the larger catalog may be perused by scrolling. Image gallery 703, for example, may correspond to any of the content catalogs of FIG. 6, wherein the respective network entity includes user device 700. In some embodiments, some, all, or none of the images in image gallery 703 include advertising. For example, images of image gallery 703 may be images as created, as stored, as modified, as uploaded, as downloaded, or otherwise in any suitable state based on history of the content. In some embodiments, the user may select one or more content items of image gallery 703 for further processing, analysis for modification, downloading, uploading, sharing, any other suitable action, or any combination thereof.

Input region 704 may include a region for text input by the user, selectable icons or soft buttons, fields, displayed user profile information, any other suitable displayed objects, or any combination thereof. In some embodiments, input region 704 includes a representation of a file directory or file folder contents, allowing the user to select or browse stored content. In some embodiments, input region 704 includes fields for user input for analysis performed in region 705.

Region 705 includes a display a representation of content undergoing analysis for content modification, details of the analysis (e.g., progress, output, current determination, completed determinations, metadata), regions for user input, any other suitable features, or any combination thereof. In some embodiments, content selected by the user is analyzed, and a representation of the analysis is presented in region 705.

In an illustrative example, the user may launch the application on user device 700, which provides a display of image gallery 703 based on images stored in user device 700. The user selects an image of image gallery 703, and enters text information to input region 704, which the application writes to metadata associated with the selected image. Any modifications, such filtering, cropping, or other photo edits to the selected image are shown in region 705. Accordingly, the user may use the application to manage storing an image, modifying an image, generating metadata for an image, or otherwise interacting with an image.

In an illustrative example, the user may launch the application on user device 700, which provides a display of image gallery 703 based on images stored in user device 700. The application may receive a request for content modification, and analyze images of image gallery 703 to determine an image suitable for content modification. The application may then modify the image with content modification and display the modified image in region 705 (e.g., as an advertisement in the user's feed displayed to the user).

In an illustrative example, the user may launch the application on user device 700, which searches for, accesses, or otherwise identifies a plurality of images stored in memory of a plurality of network entities, optionally including one or more user devices. The application may receive a request for content modification from the user, and analyze the plurality of images to determine an image suitable for content modification. The application may then select and modify the image. The modified image may be stored in memory of, or displayed on a display of, any suitable network entity, including user device 700.

In an illustrative example, the application may operate on user device 700, and the application may receive a considered image for analysis. The application may search for, accesses, or otherwise identify a plurality of images stored in memory of a plurality of network entities, optionally including one or more user devices. In some embodiments, the application may determine if the considered image is published by comparing one or more digital signatures of the considered image with reference signatures of the plurality of images. In some embodiments, the application may determine if the considered image is published by comparing metadata associated with the considered image with metadata associated with the plurality of images.

Figure 8:
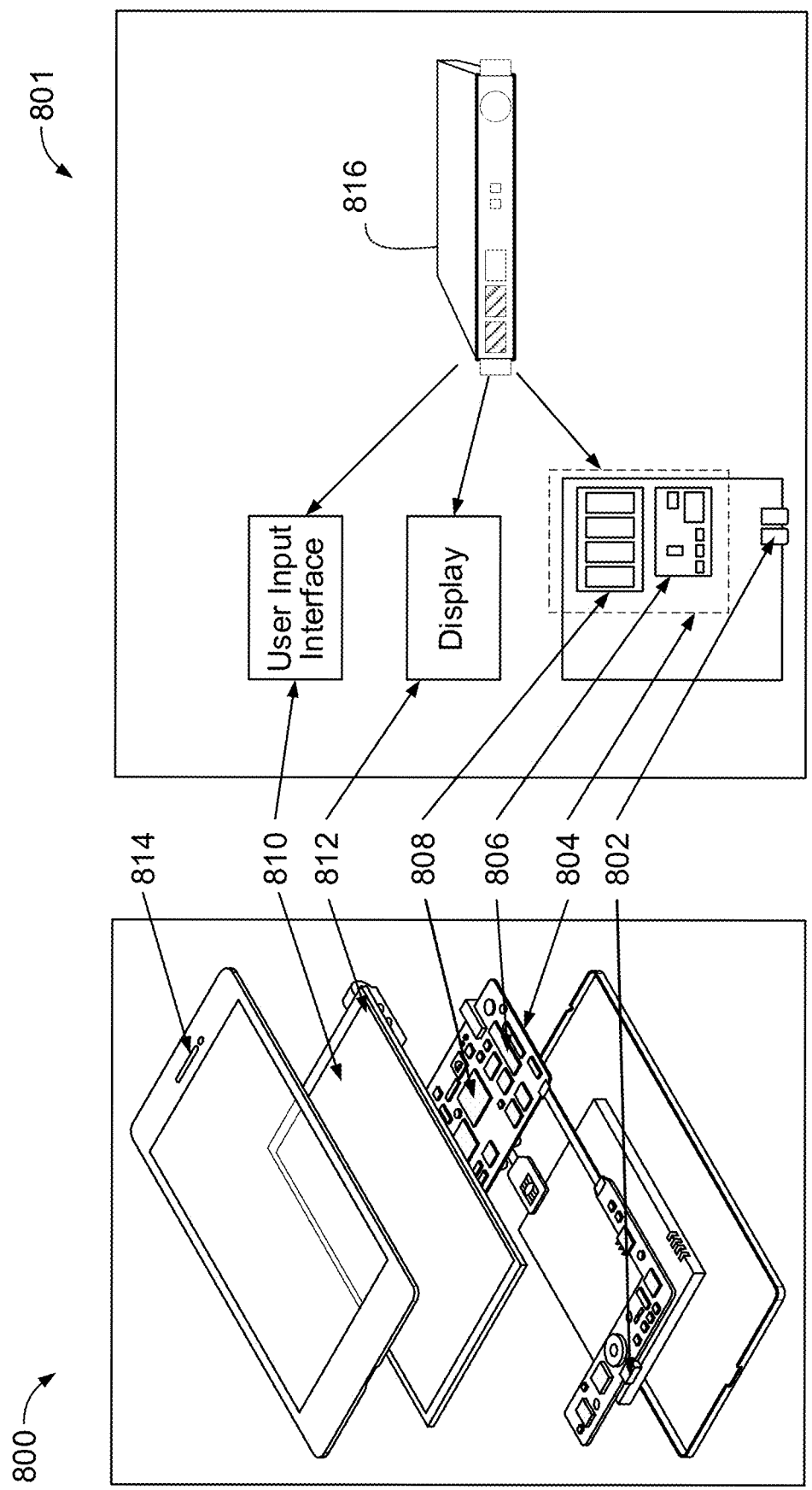
FIG. 8 is a block diagram of an illustrative user equipment, in accordance with some embodiments of the present disclosure.

A user, or network entity may access content, an application, and other features from one or more devices, one or more network-connected devices, one or more electronic devices having a display, or a combination thereof, for example. Any of the illustrative techniques of the present disclosure may be implemented by a user device, a network-connected device, a device providing a display to a user, or any other suitable control circuitry configured to identify and analyze content. FIG. 8 shows generalized embodiments of an illustrative network-connected device. User device 800, as illustrated, includes smart phone configured to generate content, display content, modify content, or otherwise provide for an interaction between the user the content. Computing system 801 may include a server or other computing device that is connected to a communications network, and optionally may include, or be communicatively coupled to, display 812, audio equipment 814, and input interface 810. In some embodiments, display 812 may include a television display or a computer display. In some embodiments, user interface input 810 is a remote-control device. Network device 816 may include one or more circuit boards. In some embodiments, the one or more circuit boards include processing circuitry, control circuitry, and storage (e.g., RAM, ROM, Hard Disk, Removable Disk, etc.). In some embodiments, circuit boards include an input/output path. Each one of user equipment device 800 and computing system 801 may receive content and data via input/output (hereinafter "I/O") path 802. I/O path 802 may provide content and data to control circuitry 804, which includes processing circuitry 806 and storage 808. Control circuitry 804 may be used to send and receive commands, requests, and other suitable data using I/O path 802. I/O path 802 may connect control circuitry 804 (and specifically processing circuitry 806) to one or more communications paths (described below). I/O functions may be provided by one or more of these communications paths but are shown as a single path in FIG. 8 to avoid overcomplicating the drawing. While network device 816 is shown in FIG. 8 for illustration, any suitable computing device having processing circuitry, control circuitry, and storage may be used in accordance with the present disclosure. For example, network device 816 may include, be replaced by, or complemented by, a personal computer (e.g., a notebook, a laptop, a desktop), a network-based server hosting a user-accessible client device, a non-user-owned device, any other suitable device, or any combination thereof.

Control circuitry 804 may be based on any suitable processing circuitry such as processing circuitry 806. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or super-computer. In some embodiments, processing circuitry is distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 804 executes instructions for an application stored in memory (e.g., storage 808). Specifically, control circuitry 804 may be instructed by the application to perform the functions discussed above and below. For example, the application may provide instructions to control circuitry 804 to generate the media guidance displays. In some implementations, any action performed by control circuitry 804 may be based on instructions received from the application.

In some client-server-based embodiments, control circuitry 804 includes communications circuitry suitable for communicating with an application server or other networks or servers. The instructions for carrying out the above-mentioned functionality may be stored on the application server. Communications circuitry may include a cable modem, an integrated-services digital network (ISDN) modem, a digital subscriber line (DSL) modem, a telephone modem, an ethernet card, or a wireless modem for communications with other equipment, or any other suitable communications circuitry. Such communications may involve the Internet or any other suitable communications networks or paths. In addition, communications circuitry may include circuitry that enables peer-to-peer communication of user equipment devices, or communication of user equipment devices in locations remote from each other (described in more detail below).

Memory may be an electronic storage device such as storage 808 that is part of control circuitry 804. As referred to herein, the phrase "electronic storage device" or "storage device" should be understood to mean any device for storing electronic data, computer software, or firmware, such as random-access memory, read-only memory, hard drives, optical drives, solid state devices, quantum storage devices, gaming consoles, gaming media, or any other suitable fixed or removable storage devices, and/or any combination of the same. Storage 808 may be used to store various types of content described herein as well as media guidance data described above. Nonvolatile memory may also be used (e.g., to launch a boot-up routine and other instructions). Cloud-based storage, for example, may be used to supplement storage 808 or instead of storage 808.

A user may send instructions to control circuitry 804 using user input interface 310. Input interface 810, display 812, or both, may include a touchscreen configured to provide a display and receive haptic input. For example, the touchscreen may be configured to receive haptic input from a finger, a stylus, or both. In some embodiments, user device 800 may include a front-facing screen and a rear-facing screen, multiple front screens, or multiple angled screens. In some embodiments, input interface 810 includes a remote-control device having one or more microphones, buttons, keypads, any other components configured to receive user input or combinations thereof. For example, input interface 810 may include a handheld remote-control device having an alphanumeric keypad and option buttons. In a further example, input interface 810 may include a handheld remote-control device having a microphone and control circuitry configured to receive and identify voice commands and transmit information to network device 816. In some embodiments, a user may access computing system 801 using a shell such as a secure shell (SSH), an unsecured shell, a virtual private network, a login (e.g., hosted by an application), any other suitable technique for accessing computing system 801, or any combination thereof.

Audio equipment 814 may be provided as integrated with other elements of each one of user device 800 (e.g., and optionally of computing system 801, although not shown) or may be stand-alone units. The audio component of videos and other content displayed on display 812 may be played through speakers of audio equipment 814. In some embodiments, the audio may be distributed to a receiver (not shown), which processes and outputs the audio via speakers of audio equipment 814. In some embodiments, for example, control circuitry 804 is configured to provide audio cues to a user, or other audio feedback to a user, using speakers of audio equipment 814. Audio equipment 814 may include a microphone configured to receive audio input such as voice commands or speech. For example, a user may speak letters or words that are received by the microphone and converted to text by control circuitry 804. In a further example, a user may voice commands that are received by the microphone and recognized by control circuitry 804.

An application (e.g., for generating a display) may be implemented using any suitable architecture. For example, a stand-alone application may be wholly implemented on each one of user device 800 and computing system 801. In some such embodiments, instructions of the application are stored locally (e.g., in storage 808), and data for use by the application is downloaded on a periodic basis (e.g., from an out-of-band feed, from an Internet resource, or using another suitable approach). Control circuitry 804 may retrieve instructions of the application from storage 808 and process the instructions to generate any of the displays discussed herein. Based on the processed instructions, control circuitry 804 may determine what action to perform when input is received from input interface 810. For example, movement of a cursor on a display up/down may be indicated by the processed instructions when input interface 810 indicates that an up/down button was selected. An application and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media card, register memory, processor cache, Random Access Memory (RAM), etc.

In some embodiments, the application is a client-server-based application. Data for use by a thick or thin client implemented on each one of user device 800 and computing system 801 is retrieved on-demand by issuing requests to a server remote from each one of user device 800 and computing system 801. For example, the remote server may store the instructions for the application in a storage device. The remote server may process the stored instructions using circuitry (e.g., control circuitry 804) and generate the displays discussed above and below. The client device may receive the displays generated by the remote server and may display the content of the displays locally on user device 800. This way, the processing of the instructions is performed remotely by the server while the resulting displays (e.g., that may include text, a keyboard, or other visuals) are provided locally on user device 800. User device 800 may receive inputs from the user via input interface 810 and transmit those inputs to the remote server for processing and generating the corresponding displays. For example, user device 800 may transmit a communication to the remote server indicating that an up/down button was selected via input interface 810. The remote server may process instructions in accordance with that input and generate a display of the application corresponding to the input (e.g., a display that moves a cursor up/down). The generated display is then transmitted to user device 800 for presentation to the user.

In some embodiments, the application is downloaded and interpreted or otherwise run by an interpreter or virtual machine (e.g., run by control circuitry 804). In some embodiments, the application may be encoded in the ETV Binary Interchange Format (EBIF), received by control circuitry 804 as part of a suitable feed, and interpreted by a user agent running on control circuitry 804. For example, the application may be an EBIF application. In some embodiments, the application may be defined by a series of JAVA-based files that are received and run by a local virtual machine or other suitable middleware executed by control circuitry 804.

In some embodiments, a system may include a user interface, with processing occurring remotely (e.g., at a network entity), as illustrated in FIGS. 4-6, for example.

Figure 9:
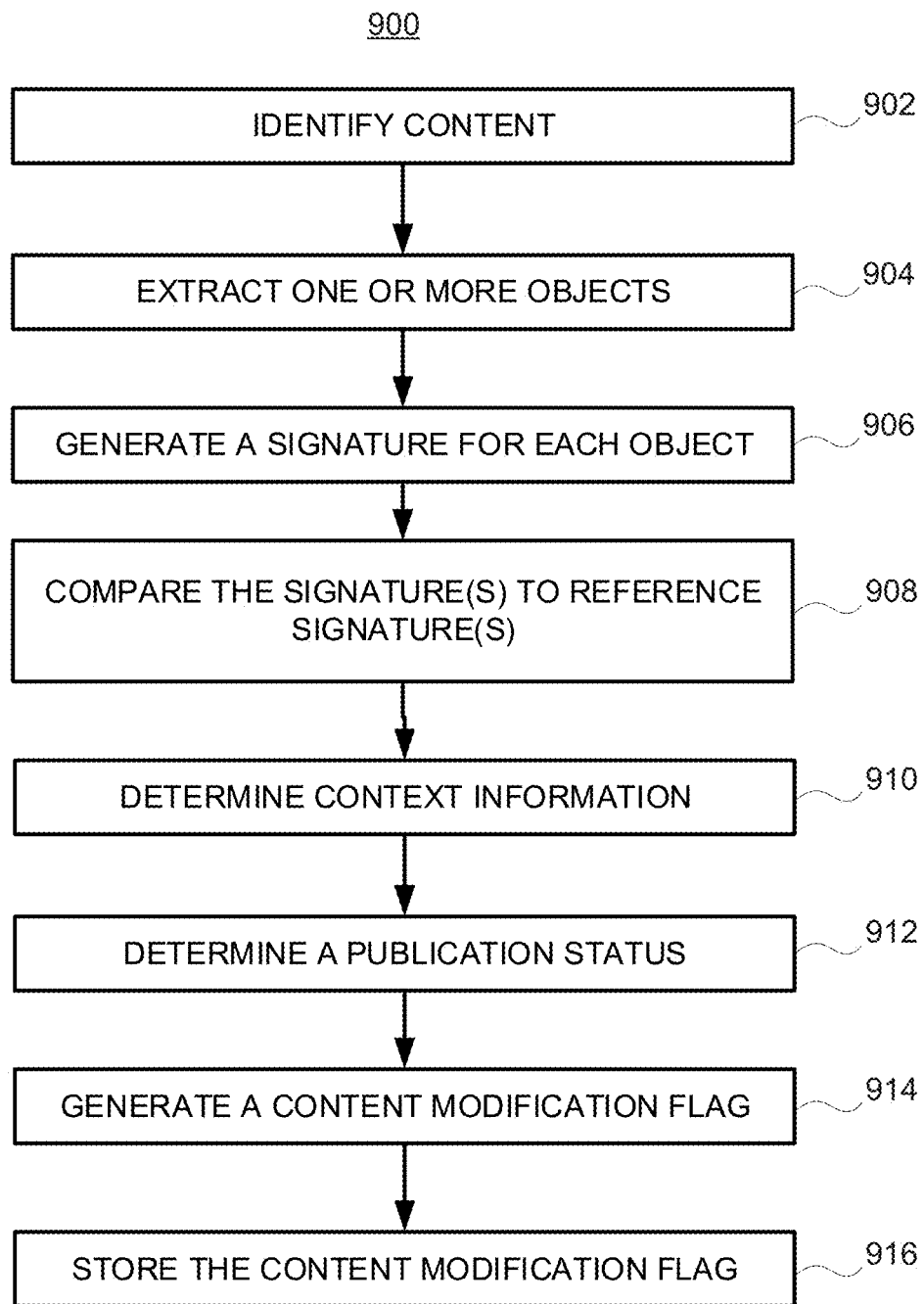
FIG. 9 is a flowchart of an illustrative process for analyzing content for content modification, in accordance with some embodiments of the present disclosure.

FIG. 9 is a flowchart of an illustrative process 900 for analyzing content for content modification, in accordance with some embodiments of the present disclosure. Process 900 may be implemented by any suitable device or combination of devices including, any of the devices illustrated in FIGS. 4-8.

Step 902 includes control circuitry identifying content stored in memory of one or more devices. In some embodiments, the control circuitry identifies the content based on receiving a request to analyze the content. In some embodiments, the control circuitry identifies the content during a search process wherein a plurality of content is considered. The control circuitry and memory may, but need not, reside within the same device.

Step 904 includes control circuitry extracting one or more objects depicted in the content. In some embodiments, the control circuitry utilizes one or more known techniques for object recognition including, for example, edge detection, color pattern recognition, partial linear filtering, regression algorithms, neural network pattern recognition, or a combination thereof. In some embodiments, the extracting the object is based on metadata associated with the content. For example, the metadata may include one or more tags that indicate that the content includes a person, a place, an item, any other suitable object, or a combination thereof.

Step 906 includes control circuitry generating signatures for each object extracted at step 904. Signatures include, for example, information about one or more pixels associated with an object of the content, information about the object (e.g., shape information, size information, feature information), any other suitable information describing an object, or any combination thereof.

Step 908 includes control circuitry comparing the signatures to reference signatures. In some embodiments, the control circuitry utilizes one or more known techniques for comparing digital signatures such as mean squared error, structural similarity, or other suitable technique. In some circumstances, the control circuitry determines a match between the signatures and reference signatures based on a previous comparison of the determined object to known objects, previous determination of reference signatures of objects, or other previous analysis.

Step 910 includes control circuitry determining context information about the content. In some embodiments, the control circuitry determines context information about the content based on the comparison of step 908. Context information includes, for example, information about what is depicted in the content including objects, entities, events, scenes, places, persons, items, or other aspects depicted in the content.

Step 912 includes control circuitry determining a publication status of the content. In some embodiments, the control circuitry determines whether content is public, publicly available, private, shared, or undesignated. In some embodiments, publication identifier 251 accesses metadata to determine whether content has been previously tagged as public or private. In some embodiments, the control circuitry determines whether the content is public based on whether is publicly available. For example, the control circuitry may generate one or more digital signatures corresponding to the content that describe features and aspects of the content. The control circuitry then compares the digital signatures against one or more reference signatures of publicly available content to identify the content as being publicly available.

Step 914 includes control circuitry generating a content modification flag. The content modification flag may include one or more status identifiers (e.g., "restricted," "unrestricted," "conditionally restricted,"), flag values (e.g., binary values, a score or ranking, or other numerical value), or a combination thereof. In some embodiments, the control circuitry generates a score or other ranking value, which provides a relative indication of how suitable content is for content modification (e.g., for comparison with other content for the most suitable content for a particular instance of content modification). In some embodiments, the control circuitry generates a binary content modification flag, indicating whether the content is suitable for modification or not. In some embodiments, the control circuitry generates a list or collection of one or more keywords or designations, indicating for which products the content is suitable for modification, what type of modification is suitable (e.g., overlay, logo replacement, logo addition, logo removal, etc.). A content modification flag may include any suitable information arranged in any suitable format, in accordance with the present disclosure.

Step 916 includes control circuitry storing the content modification flag in memory storage of a suitable device. After generating the content modification flat at step 914, the control circuitry may then update metadata, generate metadata, or both. For example, the control circuitry may add tags to existing metadata. In some embodiments, the control circuitry reads and writes files to memory (e.g., local memory storage or remote storage via a communications network). For example, in some embodiments, the control circuitry opens a content data file and metadata, generates or updates tags or otherwise changes the metadata, writes this information to an appropriate file and saves the files in suitable storage. In some embodiments, the control circuitry updates one or more instances of metadata with the content modification flags. For example, a plurality of network entities may store instances of the content and metadata, and the control circuitry may update all, some, or at least one of the instances of metadata.

Figure 10:
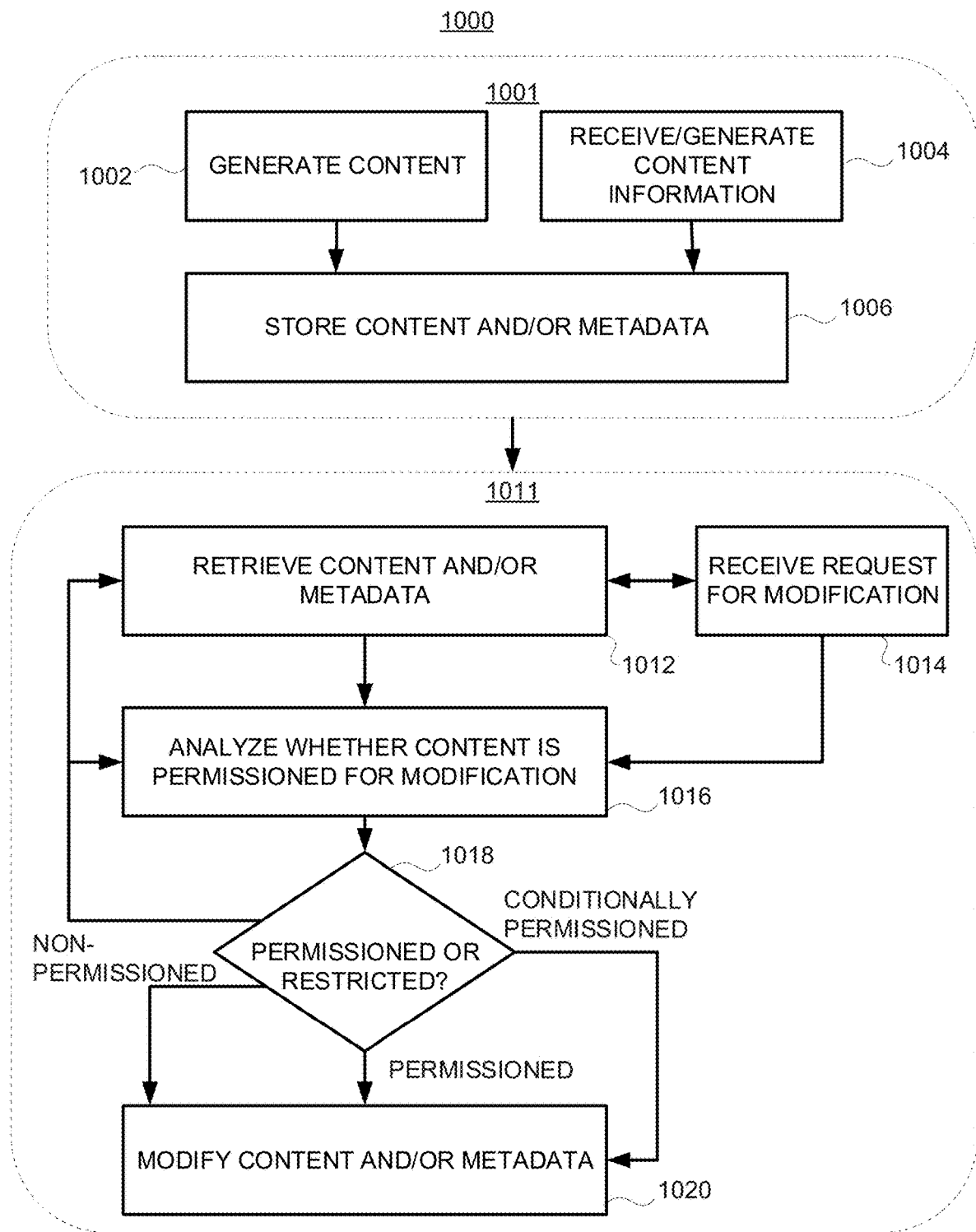
FIG. 10 is a flowchart of an illustrative process for creating and modifying content, in accordance with some embodiments of the present disclosure.

FIG. 10 is a flowchart of illustrative process 1000 for creating and modifying content, in accordance with some embodiments of the present disclosure. As illustrated, process 1000 includes process 1001 for creating content and associated metadata, and processes 1011 for analyzing and modifying the content. Process 1000 may be implemented by any suitable device or combination of devices including, any of the devices illustrated in FIGS. 4-8.

Step 1002 includes control circuitry generating content. In some embodiments, the control circuitry generates content based on a camera or imaging application implemented on a user device. For example, a user may access the application, and content may be generated based on input from the user (e.g., capturing a photo by the user pressing a soft button). In a further example, the application may select existing content and modify, convert, copy, or other generate new content based on the existing content (e.g., with or without user input). Generating content may include, for example, storing one or more data files, storing one or more metadata files, Step 1004 includes control circuitry receiving and/or generating content information. In some circumstances, content is generated at step 1002 and stored in memory of a user device. At some later time, for example, the content may be identified and received from memory by the control circuitry. In a further example, content is generated at step 1002, and content information (e.g., metadata) is received, retrieved, generated or a combination thereof. In some embodiments, steps 1002 and 1004 are combined, with content data and metadata being generated at approximately the same time.

Step 1006 includes control circuitry storing content, associated metadata or both. In some embodiments, the control circuitry reads and writes files to memory (e.g., local memory storage or remote storage via a communications network). For example, in some embodiments, the control circuitry generates a content data file and metadata file for storage. In a further example, the control circuitry writes this information to an appropriate existing file and saves the files in suitable storage.

In an illustrative example, steps 1002, 1004, and 1006 may be performed at substantially the same time, such as when an image is created and stored. Process 1001 may be performed by a user device based on input from a user, by a network entity based on an application, or a combination thereof. In some embodiments, any of steps 1002, 1004, and 1006 may be omitted combined with other steps, or otherwise modified, in accordance with the present disclosure.

Step 1012 includes control circuitry retrieving content, metadata, or both. For example, the control circuitry may retrieve the content and associated metadata stored during process 1001, or any other suitable content and associated metadata. The content and metadata, which may include one or more datafiles, may be stored in any suitable memory storage (e.g., storage 808). In some embodiments, the control circuitry retrieves the content and metadata in response to identifying the content, which is stored in memory of one or more devices. For example, the control circuitry may identify the content based on receiving a request to analyze the content. In some embodiments, the control circuitry identifies and/or retrieves the content during a search process wherein a plurality of content is considered. The control circuitry and memory wherein the content is stored may, but need not, reside within the same device.

Step 1014 includes control circuitry receiving a request for content modification. Step 1014 may be performed before step 1012 (e.g., content is retrieved in response to the request for content modification), after step 1012 (e.g., content is retrieved, and a request is subsequently received), or at the same time as step 1012 (e.g., a request is received, wherein the request includes identified content for analysis).

In some embodiments, step 1014 includes two requests: a first request for analysis of content, and a second request for content modification.

Step 1016 includes control circuitry analyzing whether the content is permissioned for modification. Step 1016 includes any of the analyses described in the context of FIGS. 1-3, for example. The control circuitry performs any or all of publication analysis (e.g., using publication identifier 251), restriction analysis (e.g., using restriction identifier 252), context analysis (e.g., using context identifier 253), compatibility analysis (e.g., using compatibility identifier 254), and classification analysis (e.g., using image classifier 255), along with any other suitable analyses. In some embodiments, the content is analyzed without respect to a particular content modification (e.g., whether the content is permissioned for any content modification). In some embodiments, the content is analyzed with respect to a particular modification (e.g., whether the content is permissioned for the particular modification).

Step 1018 includes control circuitry determining whether the content is permissioned for modification based on the analysis. In some embodiments, the control circuitry determines whether the content is permissioned based on a content modification flag or other indicator in metadata (e.g., generated during step 1016). In some embodiments, steps 1016 and 1018 are combined or otherwise performed at the same time. The control circuitry may determine that content is permissioned, non-permissioned, or conditionally permissioned In some embodiments, a binary metric is used to determine whether content is permissioned at step 1018. For example, a content modification flag of "0" or "1," or other binary indicator, may be determined based the analyses of step 1016. If the flag corresponds to a permissioned value, then the content is determined to be permissioned, and if the flag corresponds to a non-permissioned value, then the content is determined to be not permissioned.

In some embodiments, a score or other non-binary metric is determined and compared to a threshold to determine whether content is permissioned at step 1018. For example, a permission index may be determined based the analyses of step 1016, and the permission index may be compared with a threshold. If the permission index exceeds the threshold, the content is determined to be permissioned, and if the permission index does not exceed the threshold, the content is determined to be not permissioned.

Step 1020 includes control circuitry modifying the content, the metadata, or both. The control circuitry may, for example, modify the analyzed and permissioned content with content modification, update metadata associated with the analyzed and permissioned content with an indicator, or update metadata associated with the analyzed and non-permissioned content with an indicator.

In an illustrative example, the control circuitry may receive a request for content modification at step 1014, and then identify and retrieve a plurality of candidate content at step 1012. The control circuitry may then analyze whether the candidate content is permissioned for the content modification at step 1016, and if determined to be permissioned at step 1018, the control circuitry may proceed to modify the content at step 1020.

In an illustrative example, the control circuitry may receive a request for content modification at step 1014, which includes candidate content and metadata. The control circuitry may then analyze whether the candidate content is permissioned for the content modification at step 1016, and if determined to be permissioned at step 1018, the control circuitry may proceed to modify the metadata with a content modification flag at step 1020.

The illustrative steps and processes of FIGS. 9-10 may be implanted using any suitable systems, devices, and arrangements described in the context of FIGS. 1-8. For example, processes 900, 1001, and 1011, or any steps thereof, may be performed by control circuitry of a user device, a network entity, or both, based on content stored in memory of a user device, a network entity, or both. In a further example, the control circuitry may implement computer readable instructions of an application. In some embodiments, a tagging engine generates tags for content, a photo selection engine identifies, retrieves and parses content, and a content modification engine determines whether content is suitable for content modification (e.g., and may perform the content modification). The tagging engine may include any suitable aspects of, for example, content analyzer 250 and metadata manager 270. The photo selection analyzer may include any suitable aspects of, for example, content analyzer 250. The content modification engine may include any suitable aspects of, for example, content analyzer 250.

In an illustrative example, process 1001 may be performed at a user device. For example, users' photos are typically stored in various locations including a user's personal devices (e.g., a smart phone or laptop) and in the cloud with services such as Google Photos, Twitter, or Facebook (e.g., applications for managing content). In some embodiments, a user submits a photo to an application or service (e.g., taking a photo on an iOS-based device, Android-based device or other user device and having it appear in a feed, or posting a photo in a social media feed such as Facebook, Twitter, or similar services), or otherwise shares the photo (e.g., by emailing the photo or otherwise including it as part of a message). A tagging engine (e.g., content analyzer 250 with metadata manager 270) tags the local copy of the photo with a unique indicator (e.g., as a suitable hash, flag or score), identifying the photo as having been published and, optionally, identifying the user or corresponding device. To illustrate, the tagging engine may determine that content emailed to a contact might still be considered private rather than published, while content submitted to a contest or website may be considered as published and no longer private.

In an illustrative example, a content modification tag may be generated (e.g., by content analyzer 250 with metadata manager 270) and stored in storage of a user device (e.g., user device 800). The tag may be stored in metadata of the content file, or as a separate file in a directory or library structure of the user device. Storing the tag as metadata allows any system to which the photo and metadata are subsequently copied to easily determine that the photo has been previously published. In some embodiments, for example, the tagging engine identifies the photo and sends it to a photo selection engine (e.g., described below).

In an illustrative example, the tagging engine may be a plug-in to the application with which the photo is published. Alternatively, or additionally, the tagging engine may be a feature of the operating system of the user's device (e.g., user device 800). For example, applications use an operating system (OS) application programming interface (API) call for discovering locally-stored photos and selecting them for uploading, sharing, modifying, or other actions. In some embodiments, the called routine will tag (e.g., update metadata for) the photo, for example, just before uploading the photo to a service or application. In some embodiments, if the tagging engine is resident on the user's device, the tag is supplied as metadata with the photo to the receiving service or application (e.g., Google Photos, Facebook, Twitter, etc.). Tags may be generated based on user input (e.g., user-specified tags or "user-tagging"), based on analysis (e.g., of content analyzer 250 as an "auto-tagging" process), or a combination thereof. In some embodiments, the tagging engine may update metadata based on user-tagging, auto-tagging, or both. For example, the tagging engine may weigh tags, with machine tags having a lower weight than a user tag.

In an illustrative example, the receiving service or application performs the tagging (e.g., rather than the user device). Such services or applications may tag the photo upon upload (e.g., when included initially in a tweet or Facebook post), at the time the photo is actually shared (e.g., as opposed to when it is merely stored in a folder accessible only to the user), or at some other time (e.g., as part of a scheduled analysis of content). The tag may be stored as metadata associated with the photo or in a directory or library structure storing the photo, which may reside in any suitable memory. In some embodiments, the photo is also tagged with any privacy settings under which the photo was published. For example, the photo may be considered published for some other users, for some restricted purposes, or other conditional publishing. In some embodiments, services and applications may omit tagging altogether and provide an API by which a photo selection engine may query the service for published photos.

A photo selection engine selects or confirms photos for content modification (e.g., by a suitable content modification engine). The photo selection engine may include any suitable aspects of content analyzer 250, for example.

In an illustrative example, the photo selection engine may be a component of a cloud service (e.g., executing on an application server of Google Photo, Facebook, Twitter, or other such services), resident on the user device (e.g., as part of a client of such services, or as part of the OS), or executed on a third-party server that is queried by applications and services for photos appropriate for content modification (e.g., a "clearinghouse" model).

In an illustrative example, a content modification engine may query (e.g., provide a request to) the photo selection engine in a number of ways. In some embodiments, the content modification engine supplies a user identifier and, optionally, a number of attributes. The photo selection engine searches a dataset of photos (e.g., stored in memory of one or more user devices or network entities) attempting to match the user identifier and attributes. Matching photos are returned to the content modification engine.

In an illustrative example, the content modification engine supplies an actual photo (e.g., rather a user identifier and attributes). The content modification engine (e.g., content analyzer 250 or modules thereof) will determine whether the photo has a tag (as described above), or use pattern matching or other suitable processes (e.g., image or object recognition) for determining whether there is a matching photo in its dataset. If there is a matching tag or photo, the photo selection agent confirms via a suitable return value that the photo has been published and is suitable for content modification.

In an illustrative example, the photo dataset of the photo selection engine may take various forms. In some embodiments, the tagging engine identifies photos and sends them to the photo selection engine. The photo selection engine stores and catalogs the photos, and accompanying metadata. In some embodiments, the photo selection engine mines a user device for tagged photos and catalogs the photos, optionally copying the photo or cataloging its location. For example, the photo selection engine may update or otherwise modify metadata associated with the photos for later analysis (e.g., by the content modification engine).

In an illustrative example, the photo selection engine mines public feeds and web pages for content. In some embodiments, the photo selection engine uses contextual data or metadata to associate a photo with a user and track that the photo is published. In some embodiments, the photo selection engine uses pattern matching and/or image recognition techniques to identify who is in the picture. The photo selection engine may store a location of the photo, scrape the photo (e.g., from a content catalog based on metadata), request a copy of the photo via an API of the publishing application or service (if offered), and catalog the photo and its attributes (e.g., by generating or updating metadata associated with the photo). In some embodiments, the photo selection engine builds the dataset by requesting published photos from applications or services (e.g., Google Photos, Facebook or twitter).

In some embodiments the photo selection engine, before selecting or confirming the photo for content modification, analyzes the published photo and any metadata to determine whether the photo contains material unsuitable for content modification (e.g., despite the fact the photo has been published). The photo selection engine uses pattern/image recognition to identify elements of the photo and determines whether such elements are on a blacklist (i.e., a collection of attributes rendering content restricted from modification). The photo's associated metadata may also be searched for blacklisted elements. If matches are identified between the photo and the blacklist, the photo is not selected or confirmed for content modification. A blacklist is constructed using any suitable technique, and may be unique to each user, general for all users, or specific to products considered for placement. In some embodiments, the blacklist is pre-populated to include sensitive topics given certain cultural norms of the user. For example, the blacklist may be pre-populated to include images and keywords associated with places of worship, funeral homes, or other venues or objects generally regarded as inappropriate for content modification. In some embodiments, the blacklist is constructed over time based on feedback from the user. For example, the photo selection engine may provide an API by which applications (e.g., content modification engines or tagging engines) can provide feedback. In an illustrative example, a social media feed may offer a user interface (UI) element to allow a user to express displeasure with content modification in a given photo. In response to the user's use of the element, the social media feed may communicate (e.g., generate a call) to the photo selection engine to register the user's displeasure (e.g., using any suitable message, information, or tag). Arguments for the communication may include, for example, the photo itself, attributes of the photo, photo metadata, an identification of what was placed, what was replaced, privacy settings of the photo, any other information or images suitable for including in the blacklist, or any combination thereof. In an illustrative example, the photo selection engine may apply facial recognition software to filter out content including children for ethical purposes (e.g., to prevent using someone's child's likeness to advertise products), legal reasons (e.g., data privacy laws for people under 18 years of age, or under 13 years of age), user-specified criteria (e.g., a user prefers not to have family photos considered for content modification), or a combination thereof. In some embodiments, the photo selection engine may use privacy settings of a photo when determining whether content is suitable or otherwise permissioned for content modification. For example, the photo selection engine may determine not to select photos that have something less than a publicly-shared privacy setting.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method comprising:
extracting one or more objects depicted in a content item;
determining information about what is depicted in the content item based on the extracted one or more objects depicted in the content item;
generating a content modification flag based on the information about what is depicted in the content item, wherein the content modification flag indicates whether the content item is suitable for content modification; and
storing the content modification flag in data storage, wherein the content modification flag is linked to the content item.

2. The method of claim 1, wherein determining information about what is depicted in the content item comprises identifying and categorizing the extracted one or more objects.

3. The method of claim 1, wherein the information comprises at least one of: an entity, an event, or a location.

4. The method of claim 1, wherein:
determining information about what is depicted in the content item comprises determining that at least one of the extracted one or more objects is representative of an advertisement, and
the content modification flag indicates the content item is suitable for content modification.

5. The method of claim 1, further comprising:
determining that at least one of the extracted one or more objects matches restriction criteria; and
wherein the content modification flag indicates the content item is not suitable for content modification.

6. The method of claim 1, wherein:
determining information about what is depicted in the content item comprises determining that at least one of the extracted one or more objects is representative of a spiritual or religious place; and
the content modification flag indicates the content item is not suitable for content modification.

7. The method of claim 1, further comprising:
determining that at least one of the extracted one or more objects matches an object in a list of objects indicated as inappropriate for content modification; and
wherein the content modification flag indicates the content item is not suitable for content modification.

8. The method of claim 7, further comprising:
generating the list of objects based on received input comprising a negative indication with content modification of a particular content item.

9. The method of claim 7, wherein the list of objects is pre-populated.

10. The method of claim 1, wherein:
determining information about what is depicted in the content item comprises determining that at least one of the extracted one or more objects is representative of a child, and
the content modification flag indicates the content item is not suitable for content modification.

11. A system comprising:
control circuitry configured to:
extract one or more objects depicted in a content item;
determine information about what is depicted in the content item based on the extracted one or more objects of the content item; and
generate a content modification flag based on the information about what is depicted in the content item, wherein the content modification flag indicates whether the content item is suitable for content modification; and
input/output circuitry configured to:
store the content modification flag in data storage, wherein the content modification flag is linked to the content item.

12. The system of claim 11, wherein the control circuitry is configured to determine information about what is depicted in the content item by identifying and categorizing the extracted one or more objects.

13. The system of claim 11, wherein the information comprises at least one of: an entity, an event, or a location.

14. The system of claim 11, wherein:
the control circuitry is configured to determine information about what is depicted in the content item by:
determining that at least one of the extracted one or more objects is representative of an advertisement; and
the content modification flag indicates the content item is suitable for content modification.

15. The system of claim 11, wherein:
the control circuitry is further configured to:
determine that at least one of the extracted one or more objects matches restriction criteria; and
the content modification flag indicates the content item is not suitable for content modification.

16. The system of claim 11, wherein:
the control circuitry is configured to determine information about what is depicted in the content item by:
determining that at least one of the extracted one or more objects is representative of a spiritual or religious place; and
the content modification flag indicates the content item is not suitable for content modification.

17. The system of claim 11, wherein:
the control circuitry is further configured to:
determine that at least one of the extracted one or more objects matches an object in a list of objects indicated as inappropriate for content modification; and
the content modification flag indicates the content item is not suitable for content modification.

18. The system of claim 17, wherein the control circuitry is further configured to:
generate the list of objects based on received input comprising a negative indication with content modification of a particular content item.

19. The system of claim 17, wherein the list of objects is pre-populated.

20. The system of claim 11, wherein:
the control circuitry is configured to determine information about what is depicted in the content item by determining that at least one of the extracted one or more objects is representative of a child, and the content modification flag indicates the content item is not suitable for content modification.

\* \* \* \* \*